(12) United States Patent
Ausen et al.

(10) Patent No.: US 9,327,429 B2
(45) Date of Patent: May 3, 2016

(54) EXTRUSION DIE ELEMENT, EXTRUSION DIE AND METHOD FOR MAKING MULTIPLE STRIPE EXTRUDATE

(75) Inventors: Ronald W. Ausen, St. Paul, MN (US); William J. Kopecky, Hudson, WI (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 551 days.

(21) Appl. No.: 13/635,520

(22) PCT Filed: Mar. 8, 2011

(86) PCT No.: PCT/US2011/027542
§ 371 (c)(1),
(2), (4) Date: Sep. 17, 2012

(87) PCT Pub. No.: WO2011/119323
PCT Pub. Date: Sep. 29, 2011

(65) Prior Publication Data
US 2013/0009336 A1    Jan. 10, 2013

Related U.S. Application Data

(60) Provisional application No. 61/317,474, filed on Mar. 25, 2010.

(51) Int. Cl.
*B29C 47/06*     (2006.01)
*B29C 47/14*     (2006.01)
*B29C 33/30*     (2006.01)
(Continued)

(52) U.S. Cl.
CPC ........... *B29C 33/301* (2013.01); *B29C 47/0023* (2013.01); *B29C 47/065* (2013.01); *B29C 47/0828* (2013.01); *B29C 47/0837* (2013.01); *B29C 47/14* (2013.01); *B29C 47/145* (2013.01); *B29C 47/0021* (2013.01); *B29C 47/0808* (2013.01); *B29C 47/0816* (2013.01); *B29C 47/16* (2013.01); *B29C 47/86* (2013.01); *B29C 47/8845* (2013.01); *B29C 2947/92114* (2013.01);
(Continued)

(58) Field of Classification Search
CPC .............. B29C 47/065; B29C 47/0808; B29C 47/0816; B29C 47/0822; B29C 47/0828; B29C 47/0837; B29C 47/14; B29C 47/145; B29C 47/842
See application file for complete search history.

(56) References Cited

U.S. PATENT DOCUMENTS 2,031,387 A  *  2/1936  Schwarz ........................ 425/463
2,053,173 A      9/1936  Astima
(Continued)

FOREIGN PATENT DOCUMENTS

EP      0353064      1/1990
EP      0872580     10/1998
(Continued)

OTHER PUBLICATIONS

International Search Report for PCT/US2011/027542, 5 pages, May 23, 2011.

*Primary Examiner* — James Sanders
*Assistant Examiner* — Joseph Leyson
(74) *Attorney, Agent, or Firm* — Gregory D. Allen

(57) ABSTRACT

Extrusion die (30) comprising a plurality of shims (40*a*, 40*b*, 40*c*) positioned adjacent to one another, the shims (40*a*, 40*b*, 40*c*) together defining a first cavity, a second cavity, and a die slot, and methods of using the same. A variety of composite layers can be made from various dies described herein.

11 Claims, 12 Drawing Sheets

(51) Int. Cl.
*B29C 47/08* (2006.01)
*B29C 47/00* (2006.01)
*B29C 47/16* (2006.01)
*B29C 47/86* (2006.01)
*B29C 47/88* (2006.01)

(52) U.S. Cl.
CPC ............... *B29C2947/92704* (2013.01); *B29C 2947/92742* (2013.01); *B29C 2947/92904* (2013.01)

(56) References Cited

U.S. PATENT DOCUMENTS

| | | | |
|---|---|---|---|
| 2,884,126 A | 4/1959 | Ulrich |
| 3,032,008 A | 5/1962 | Land |
| 3,204,290 A | 9/1965 | Crompton |
| 3,471,588 A | 10/1969 | Kanner |
| 3,485,912 A | 12/1969 | Schrenk |
| 3,524,789 A | 8/1970 | Olsen |
| 4,426,344 A | 1/1984 | Dinter |
| 4,621,898 A | 11/1986 | Cohen |
| 4,669,965 A | 6/1987 | Murakami |
| 5,017,116 A | 5/1991 | Carter |
| 5,528,319 A | 6/1996 | Austin |
| 5,620,780 A | 4/1997 | Krueger |
| 5,648,166 A | 7/1997 | Dunshee |
| 5,679,379 A | 10/1997 | Fabbricante |
| 5,795,643 A | 8/1998 | Steininger |
| 5,948,517 A | 9/1999 | Adamko |
| 5,993,940 A | 11/1999 | Ouderkirk |
| 6,144,319 A | 11/2000 | Lutz |
| 6,171,985 B1 | 1/2001 | Joseph |
| 6,228,449 B1 | 5/2001 | Meyer |
| 6,312,787 B1 | 11/2001 | Hayashi |
| 6,348,249 B2 | 2/2002 | Meyer |
| 6,352,761 B1 | 3/2002 | Hebrink |
| 6,398,370 B1 | 6/2002 | Chiu |
| 6,465,107 B1 | 10/2002 | Kelly |
| 6,511,742 B1 | 1/2003 | Müssig |
| 6,669,887 B2 | 12/2003 | Hilston |
| 6,731,416 B2 | 5/2004 | Hazzard |
| 6,765,550 B2 | 7/2004 | Janick |
| 7,201,955 B2 | 4/2007 | Mac Master |
| 7,467,873 B2 | 12/2008 | Clarke |
| 2004/0208394 A1 | 10/2004 | Kurata |
| 2005/0060849 A1 | 3/2005 | Vanbenschoten |
| 2006/0040009 A1* | 2/2006 | Rubhausen et al. ........ 425/131.1 |
| 2006/0044290 A1 | 3/2006 | Hurwitz |
| 2006/0217000 A1* | 9/2006 | Zucker et al. ................ 439/632 |
| 2007/0153119 A1 | 7/2007 | Bilbrey |
| 2007/0154683 A1 | 7/2007 | Ausen |
| 2009/0284836 A1 | 11/2009 | Boyd |
| 2013/0004723 A1 | 1/2013 | Ausen |
| 2013/0004729 A1 | 1/2013 | Ausen |
| 2013/0011600 A1 | 1/2013 | Ausen |
| 2013/0011638 A1 | 1/2013 | Ausen |

FOREIGN PATENT DOCUMENTS

| | | |
|---|---|---|
| EP | 1757429 | 2/2007 |
| WO | WO 96-11750 | 4/1996 |
| WO | WO 96-39349 | 12/1996 |
| WO | WO 01-45918 | 6/2001 |
| WO | WO 2004-091896 | 10/2004 |
| WO | WO 2007-118122 | 10/2007 |
| WO | WO 2009-050505 | 4/2009 |
| WO | WO 2011-008396 | 1/2011 |
| WO | WO 2011-119309 | 9/2011 |

* cited by examiner

EXTRUSION DIE ELEMENT, EXTRUSION DIE AND METHOD FOR MAKING MULTIPLE STRIPE EXTRUDATE

CROSS REFERENCE TO RELATED APPLICATIONS

This application is a national stage filing under 35 U.S.C. 371 of PCT/US2011/027542, filed Mar. 8, 2011, which claims priority to U.S. Provisional Application No. 61/317,474, filed Mar. 25, 2010, the disclosure of which is incorporated by reference in its/their entirety herein.

BACKGROUND

Extrusion of multiple polymeric materials into a single layer or film is known in the art. For example, multiple polymeric flow streams have been combined in a die or feedblock in a layered fashion to provide a multilayer film having multiple layers stacked one on top of the other. It is also known, for example, to provide more complicated extruded film structures where the film is partitioned, not as a stack of layers in the thickness direction, but as stripes disposed side-by-side along the width dimension of the film.

SUMMARY

For example, co-pending and co-assigned U.S. patent application having Ser. 61/221,839, filed Jun. 30, 2009, "Extrusion Die Element, Extrusion Die and Method for Making Multiple Stripe Extrudate from Multilayer Extrudate," Ausen et al., can produce side-by-side striped films with stripes having widths of 50 mils (1.27 mm) or less. However, some desirable applications would require stripes with a more precise boundary between adjacent stripes.

There is a need for further improvements in such devices for extruding multiple stripe films.

In one aspect, the present disclosure provides an extrusion die comprising a plurality of shims positioned adjacent to one another, the shims together defining a first cavity, a second cavity, and an die slot, wherein the die slot has a distal opening wherein each of the plurality of shims defines a portion of the distal opening, wherein at least a first one of the shims that provides a passageway between the first cavity and the die slot, wherein at least a second one of the shims that provides a passageway between the second cavity and the die slot, and wherein the shims that provide a passageway between the second cavity and the die slot have first and second opposed major surfaces, and wherein said passageway extends from the first major surface to the second major surface.

In another aspect, the present disclosure provides an extrusion die comprising a plurality of shims positioned adjacent to one another, the shims together defining a first cavity, a second cavity, and an die slot, wherein the die slot has a distal opening, wherein each of the plurality of shims defines a portion of the distal opening, wherein at least a first one of the shims provides a passageway between the first cavity and the die slot, wherein at least a second one of the shims provides a passageway between the second cavity and the die slot, wherein the shims each have first and second opposed major surfaces and a thickness perpendicular to the major surfaces, and wherein the passageways extend completely through the thickness of the respective shim. Measurements of dimensions are determined using an average of 10 random measurements.

In another aspect, the present disclosure provides an extrusion die comprising a plurality of shims positioned adjacent to one another, the shims together defining a first cavity, a second cavity, and an die slot, wherein the die slot has a distal opening, wherein each of the plurality of shims defines a portion of the distal opening, wherein at least a first one of the shims provides a conduit between the first cavity and the die slot, wherein at least a second one of the shims provides a conduit between the second cavity and the die slot, and wherein if a fluid having a viscosity of 300 Pa*s at 220° C. is extruded through the extrusion die, the fluid has a shear rate of less than 2000/sec.

In another aspect, the present disclosure provides an extrusion die comprising a plurality of shims positioned adjacent to one another, the shims together defining a first cavity, a second cavity, and an die slot, wherein the die slot has a distal opening, wherein each of the plurality of shims defines a portion of the distal opening, wherein at least a first one of the shims provides a passageway between the first cavity and the die slot, wherein at least a second one of the shims provides a passageway between the second cavity and the die slot, and wherein at least one of the shims is a spacer shim providing no conduit between either the first or the second cavity and the die slot.

In another aspect, the present disclosure provides a method of making a composite layer, the method comprising:
  providing an extrusion die described herein;
  supplying a first extrudable polymeric material into the first cavity;
  supplying a second extrudable polymeric material into the second cavity; and
  extruding the first and second polymeric materials through the die slot and through the distal opening to provide a composite layer.

In another aspect, the present disclosure provides a method of making a composite layer, the method comprising:
  providing an extrusion die comprising a plurality of shims positioned adjacent to one another, the shims together defining a first cavity, a second cavity, and an die slot, wherein the die slot has a distal opening, wherein each of the plurality of shims defines a portion of the distal opening, wherein at least a first one of the shims provides a conduit between the first cavity and the die slot, wherein at least a second one of the shims provides a conduit between the second cavity and the die slot;
  supplying a first extrudable polymeric material into the first cavity;
  supplying a second extrudable polymeric material into the second cavity; and
  extruding the first and second polymeric materials through the die slot and through the distal opening to provide the composite layer comprising at least one distinct region of the first polymeric material and at least one distinct region of the second polymeric material.

Advantages of some embodiments of dies and methods of using dies described herein are they can produce composite layers described herein having relatively precise patterns of first and second polymers having in some embodiments at least one relatively small dimension. Embodiments of resultant extruded composites can exhibit advantageous characteristics.

DETAILED DESCRIPTION

Figure 1:
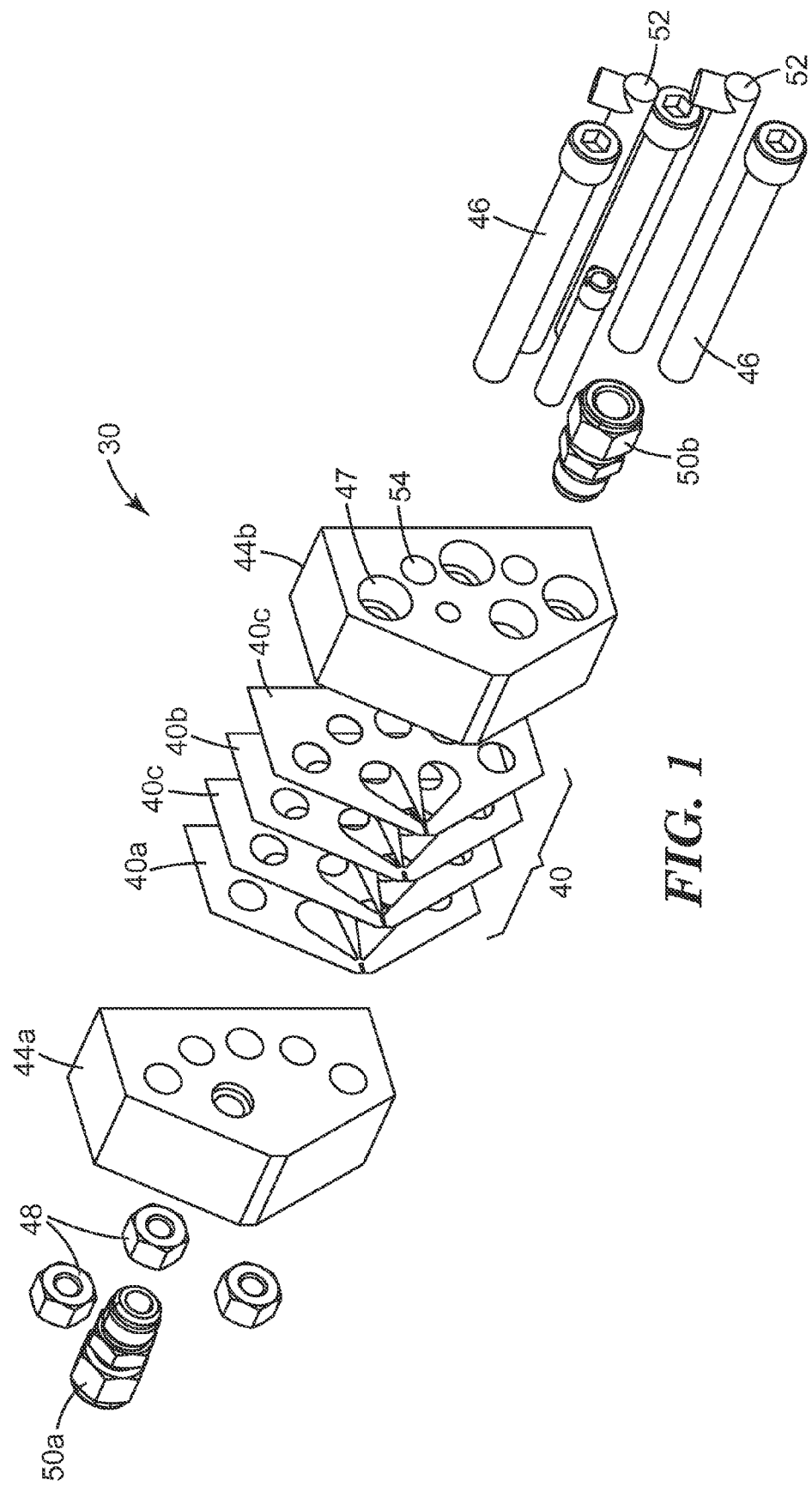
FIG. 1 is an exploded perspective view of an exemplary embodiment of a set of extrusion die elements of the present disclosure, including a plurality of shims, a set of end blocks, bolts for assembling the components, and inlet fittings for the materials to be extruded.

Dies and methods described herein can be used to make a variety of composite layers. For example, one exemplary composite layer comprising a plurality of longitudinal first zones comprised of a first polymeric material alternating with a plurality of longitudinal second zones comprised of a second polymeric material such that one first zone is disposed between two adjacent second zones, wherein the zones are generally parallel to one another, and at least one of each first zone and each second zone has a maximum width dimension of not greater than 2 mm (in some embodiments, not greater than 1.5 mm, 1 mm, 0.75 mm, 0.5 mm, or even not greater than 0.2 mm; in some embodiments, in a range from 0.25 mm to 1 mm), wherein adjacent first and second zones have an average pitch (an exemplary pitch is shown FIG. 5 as $p_s$), wherein for the composite layer there is an average of said average pitches, and wherein the average pitch for any adjacent first and second zones is within 20 (in some embodiments, 15, 10, or even within 5) percent of the average pitch for adjacent first and second zones of said average of said average pitches. In some embodiments, there are at least 10 (in some embodiments, at least 15, 20, 25, 30, 35, 40, 45, 50, 55, 60, 65, 70, 75, 80, 85, 90, 95, or even at least 100) distinct first and second zones per cm. In some embodiments, each first zone has an average width, wherein there is an average width of the first zones, and wherein said average width dimension of first zones is within 20 (optionally, 15, 10, or even within 5) percent of said average width for the first zone.

Another exemplary embodiment, a composite layer comprising:

a first plurality of longitudinal first zones comprised of a first polymeric material alternating with a plurality of longitudinal second zones comprised of a second polymeric material such that one first zone is disposed between two adjacent second zones, wherein the zones are generally parallel to one another, and at least one of each first zone or each second zone has a maximum width dimension of not greater than 2 mm (in some embodiments, not greater than 1.5 mm, 1 mm, 0.75 mm, 0.5 mm, or even not greater than 0.2 mm; optionally, in a range from 0.25 mm to 1 mm), wherein adjacent first and second zones in the first plurality have an average pitch, and wherein for the first plurality there is an average of said average pitches; and a second plurality of longitudinal first zones comprised of the first polymeric material alternating with a plurality of longitudinal second zones comprised of the second polymeric material such that one first zone is disposed between two adjacent second zones, wherein the zones are generally parallel to one another, and at least one of each first zone or each second zone has a maximum width dimension of not greater than 2 mm (optionally, not greater than 1.5 mm, 1 mm, 0.75 mm, 0.5 mm, or even not greater than 0.2 mm; optionally, in a range from 0.25 mm to 1 mm), wherein adjacent first and second zones in the first plurality have an average pitch, and wherein for the second plurality there is an average of said average pitches, wherein for the composite layer there is an average of said average pitches of the first and second average pitches, wherein the average pitch for adjacent first and second zones in each of the first and second plurality is within 20 (optionally 15, 10, or even less than 5) percent of said average of said average pitches, and wherein there is a third zone comprising the first or second polymeric material separating the first and second pluralities having a width wider than said average of said average pitches. In some embodiments, each first zone has an average width, wherein there is an average width of the first zones, and wherein said average width dimension of first zones is within 20 (in some embodiments, 15, 10, or even within 5) percent of said average width for the first zone. In some embodiments, there are at least 10 (in some embodiments, at least 15, 20, 25, 30, 35, 40, 45, 50, 55, 60, 65, 70, 75, 80, 85, 90, 95, or even at least 100) distinct first and second zones per cm.

Figure 7:
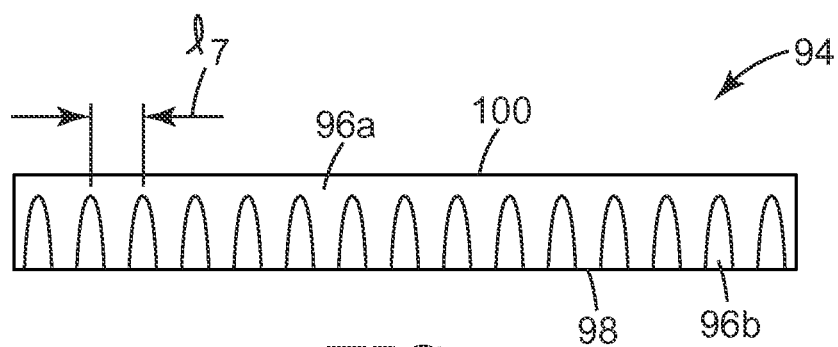
FIG. 7 is a cross-section view of a composite layer produced by a die assembled as depicted in FIG. 6, the section line being in the cross-web direction.

Another exemplary composite layer comprising a plurality of first zones of a first polymeric material partially encapsulated in a continuous matrix of a second polymeric material, wherein all first zones of the first polymeric material have an exposed area on only one major surface of the composite layer. In some embodiments, the second polymeric material has a major surface on the same major surface of the composite layer as the exposed areas of the first zones, and wherein each first zone exposed area has a maximum dimension parallel with said major surface of not greater than 1 mm (in some embodiments, not greater than 0.75 mm, 0.5 mm, 0.25 mm, 0.1 mm, 0.075 mm, 0.05 mm, 0.025 mm, or even not greater than 0.01 mm; in some embodiments, in a range from 0.01 mm to 1 mm, or even from 0.25 mm to 1 mm). In some embodiments, each first zone has a center point, wherein there is a length between two center points separated by a second zone, wherein there is an average of said lengths, where the length (exemplary lengths are shown in FIG. 7 as $l_7$ and in FIG. 9 as $l_9$) between two center points separated by a second zone are within 20 (in some embodiments, within 15, 10, or even within 5) percent of the average of said length. In some embodiments, the composite layer has an average thickness as defined between said major surface and a second, generally opposed major surface, and the exposed area of each first zone has a height perpendicular to said major surface, as measured from said major surface, that is at least 5 (in some embodiments, at least 10, 15, 20, 25, 30, 35, 40, 45, 50, 55, 60, 65, 70, 75, 80, 85, 90, 95, or even at least 100) percent of the average thickness of the composite layer. The latter composite layer exhibits ribs. In some embodiments, there are at least 10 (in some embodiments, at least 15, 20, 25, 30, 35, 40, 45, 50, 55, 60, 65, 70, 75, 80, 85, 90, 95, or even at least 100) distinct first zone exposed areas per cm.

Another exemplary composite layer comprising a plurality of longitudinal, generally parallel first zones comprised of a first polymeric material each encapsulated in a second polymeric material, wherein there are at least 10 (in some embodiments, at least 15, 20, 25, 30, 35, 40, 45, 50, 55, 60, 65, 70, 75, 80, 85, 90, 95, or even at least 100) longitudinal first zones per cm. In some embodiments, each first zone has a maximum dimension perpendicular to the longitudinal direction of not greater than 1 mm (in some embodiments, not greater than 0.75 mm, 0.5 mm, 0.25 mm, 0.1 mm, 0.075 mm, 0.05 mm, 0.025 mm, or even not greater than 0.01 mm; in some embodiments, in a range from 0.01 mm to 1 mm, or even from 0.25 mm to 1 mm). In some embodiments, each first zone has a center point, wherein there is a length (an exemplary length is shown FIG. 11 as $l_{11}$) between two center points separated by a second zone, wherein there is an average of said lengths, where the lengths between two center points separated by a second zone are within 20 (in some embodiments, within 15, 10, or even within 5) percent of the average of said lengths.

In another aspect, the present disclosure provides a composite layer comprising:

a first plurality of longitudinal, generally parallel first zones comprised of a first polymeric material each encapsulated in a second polymeric material, wherein there are at least 10 (in some embodiments, at least 15, 20, 25, 30, 35, 40, 45, 50, 55, 60, 65, 70, 75, 80, 85, 90, 95, or even at least 100) longitudinal first zones per cm, wherein each first zone has a center point, wherein there is a length between two center points separated by a second zone, and wherein there is an average of said lengths; and a second plurality of longitudinal, generally parallel first zones comprised of the first polymeric material each encapsulated in the second polymeric material, wherein there are at least 10 (in some embodiments, at least 15, 20, 25, 30, 35, 40, 45, 50, 55, 60, 65, 70, 75, 80, 85, 90, 95, or even at least 100) longitudinal first zones per cm wherein there is a length between two center points separated by a second zone, and wherein there is an average of said lengths, wherein there is an average length two center points separated by a second zone for the composite layer of the average of said averages lengths two center points separated by a second zone for the first and second pluralities, and wherein there is a third zone comprising the first or second polymeric material separating the first and second pluralities having a width wider than said average length two center points separated by a second zone for the composite layer. In some embodiments, each first zone has a maximum dimension perpendicular to the longitudinal direction of not greater than 1 mm (in some embodiments, not greater than 0.75 mm, 0.5 mm, 0.25 mm, 0.1 mm, 0.075 mm, 0.05 mm, 0.025 mm, or even not greater than 0.01 mm; in some embodiments, in a range from 0.01 mm to 1 mm, or even from 0.25 mm to 1 mm). In some embodiments, the lengths between two center points separated by a second zone are within 20 (in some embodiments, within 15, 10, or even within 5) percent of the average of said lengths between two center points separated by a second zone for the composite layer Another exemplary composite layer having a length and width and comprising:

a first plurality of repeating, three-dimensional structures having peaks and valleys, comprising a first polymeric material; and a second plurality of repeating, three-dimensional structures having peaks and valleys that is adjacent to, and the inverse of, the first plurality of repeating, three-dimensional structures, and comprising a second polymeric material, wherein there is a distance (an exemplary distance is shown FIG. 13 as $d_{13}$) between adjacent peaks comprising the first polymeric material, and wherein there is an average of said distances between adjacent peaks comprising the first polymeric material, and wherein any of said distances between adjacent peaks comprising the first polymeric material is within 20 percent of said average distance between adjacent peaks comprising the first polymeric material. In some embodiments, for the first plurality of structures, there are at least 10 (in some embodiments, at least 15, 20, 25, 30, 35, 40, 45, 50, 55, 60, 65, 70, 75, 80, 85, 90, 95, or even at least 100) peaks per cm. In some embodiments, the three-dimensional structures comprising the first polymeric material have a peak to valley height not greater than 1 mm (in some embodiments, not greater than 0.75 mm, 0.5 mm, 0.25 mm, 0.1 mm, 0.075 mm, 0.05 mm, 0.025 mm, or even not greater than 0.01 mm; in some embodiments, in a range from 0.01 mm to 1 mm, or even from 0.25 mm to 1 mm).

Typically, not all of the shims have passageways; some may be spacer shims that provide no conduit between either the first or the second cavity and the die slot. The number of shims providing a passageway between the first cavity and the die slot may be equal or unequal to the number of shims providing a passageway between the second cavity and the die slot.

In some embodiments, extrusion dies described herein include a pair of end blocks for supporting the plurality of shims. In these embodiments it may be convenient for one or all of the shims to each have one or more through-holes for the passage of connectors between the pair of end blocks. Bolts disposed within such through-holes are one convenient expedient for assembling the shims to the end blocks, although the ordinary artisan may perceive other alternatives for assembling the extrusion die. In some embodiments, the at least one end block has an inlet port for introduction of fluid material into one or both of the cavities.

In some embodiments, the shims will be assembled according to a plan that provides a repeating sequence of shims of diverse types. The repeating sequence can have two or more shims per repeat. For a first example, a two-shim repeating sequence could comprise a shim that provides a conduit between the first cavity and the die slot and a shim that provides a conduit between the second cavity and the die slot. For a second example, a four-shim repeating sequence could comprise a shim that provides a conduit between the first cavity and the die slot, a spacer shim, a shim that provides a conduit between the second cavity and the die slot, and a spacer shim.

The shape of the passageways within, for example, a repeating sequence of shims, may be identical or different. For example, in some embodiments, the shims that provide a conduit between the first cavity and the die slot might have a flow restriction compared to the shims that provide a conduit between the second cavity and the die slot. The width of the distal opening within, for example, a repeating sequence of shims, may be identical or different. For example, the portion of the distal opening provided by the shims that provide a conduit between the first cavity and the die slot could be narrower than the portion of the distal opening provided by the shims that provide a conduit between the second cavity and the die slot.

The shape of the die slot within, for example, a repeating sequence of shims, may be identical or different. For example a 4-shim repeating sequence could be employed having a shim that provides a conduit between the first cavity and the die slot, a spacer shim, a shim that provides a conduit between the second cavity and the die slot, and a spacer shim, wherein the shims that provide a conduit between the second cavity and the die slot have a narrowed passage displaced from both edges of the distal opening.

In some embodiments, the assembled shims (conveniently bolted between the end blocks) are further clamped within a manifold body. The manifold body has at least one (or more; usually two) manifold therein, the manifold having an outlet. An expansion seal (e.g., made of copper) is disposed so as to seal the manifold body and the shims, such that the expansion seal defines a portion of at least one of the cavities (in some embodiments, a portion of both the first and second cavities), and such that the expansion seal allows a conduit between the manifold and the cavity.

In some embodiments of dies described herein, the first passageway has a first average length and a first average minor perpendicular dimension, wherein the ratio of the first average length to the first average minor perpendicular dimension is in a range from 200:1 (in some embodiments, 150:1, 100:1, 75:1, 50:1, or even 10:1) to greater than 1:1 (in some embodiments, 2:1) (typically, 50:1 to 2:1), wherein the second passageway has a second average length and a second average minor perpendicular dimension, and wherein the ratio of the second average length to the second average minor perpendicular dimension is in a range from 200:1 (in some embodiments, 150:1, 100:1, 75:1, 50:1, or even 10:1) to greater than 1:1 (in some embodiments, 2:1) (typically, 50:1 to 2:1).

In some embodiments of dies described herein, if a fluid having a viscosity of 300 Pa*s at 220° C. is extruded through the extrusion die, the fluid has a shear rate of less than 2000/sec, wherein the viscosity is determined using a capillary rheometer (available from Rosand Precision Ltd., West Midland, England, under the trade designation "Advanced Rheometer System"; Model RH-2000).

In accordance with another aspect of the present disclosure, a method of making a composite layer is provided, the method comprising: providing an extrusion die comprising a plurality of shims positioned adjacent to one another, the shims together defining a first cavity, a second cavity, and an die slot, wherein the die slot has a distal opening, wherein each of the plurality of shims defines a portion of the distal opening, wherein at least a first one of the shims provides a conduit between the first cavity and the die slot, wherein at least a second one of the shims provides a conduit between the second cavity and the die slot; supplying a first extrudable polymeric material into the first cavity; supplying a second extrudable polymeric material into the second cavity; extruding the first and second polymeric materials through the die slot and through the distal opening to provide the composite layer comprising at least one distinct region of the first polymeric material and at least one distinct region of the second polymeric material. As used in this context, "extrudable polymeric material" refers to polymeric material with 100 percent solids when extruded.

In practicing the method, the first and second polymeric materials might be solidified simply by cooling. This can be conveniently accomplished passively by ambient air, or actively by, for example, quenching the extruded first and second polymeric materials on a chilled surface (e.g., a chilled roll). In some embodiments, the first and/or second polymeric materials are low molecular weight polymers that need to be cross-linked to be solidified, which can be done, for example, by electromagnetic or particle radiation.

In some embodiments, the die distal opening has an aspect ratio of at least 100:1 (in some embodiments, at least 500:1, 1000:1, 2500:1, or even at least to 5000 to 1).

Methods described herein can be operated at diverse pressure levels, but for many convenient molten polymer operations the first polymeric materials in the first cavities and/or the polymeric materials in the second cavities are kept at a pressure greater than 100 psi (689 kPa). The amount of material being throughput via the first and second cavities may be equal or different. In particular, by volume, the ratio of the first polymeric material passing through the distal opening to the second polymeric material passing through the distal opening can be over 5:1, 10:1, 20:1, 25:1, 50:1, 75:1, or even over 100:1.

The method may be operated over a range of sizes for the die slot. In some embodiments, it may be convenient for the first and second polymeric materials not to remain in contact while unsolidified for longer than necessary. It is possible to operate embodiments of methods of the present disclosure such that the first polymeric material and the second polymeric material contact each other at a distance not greater than 25 mm (in some embodiments, not greater than 20 mm, 15 mm, 10 mm, 5 mm, or even not greater than 1 mm) from the distal opening. The method may be used to prepare a composite layer having a thickness in a range from 0.025 mm to 1 mm.

Referring to FIG. 1, an exploded view of an exemplary embodiment of an extrusion die 30 according to the present disclosure is illustrated. Extrusion die 30 includes plurality of shims 40. In some embodiments, there will be a large number of very thin shims 40 (typically several thousand shims; in some embodiments, at least 1000, 2000, 3000, 4000, 5000, 6000, 7000, 8000, 9000, or even at least 10,000), of diverse types (shims 40a, 40b, and 40c), compressed between two end blocks 44a and 44b. Conveniently, fasteners (e.g., through bolts 46 threaded onto nuts 48) are used to assemble the components for extrusion die 30 by passing through holes 47. Inlet fittings 50a and 50b are provided on end blocks 44a and 44b respectively to introduce the materials to be extruded into extrusion die 30. In some embodiments, inlet fittings 50a and 50b are connected to melt trains of conventional type. In some embodiments, cartridge heaters 52 are inserted into receptacles 54 in extrusion die 30 to maintain the materials to be extruded at a desirable temperature while in the die.

Figure 2:
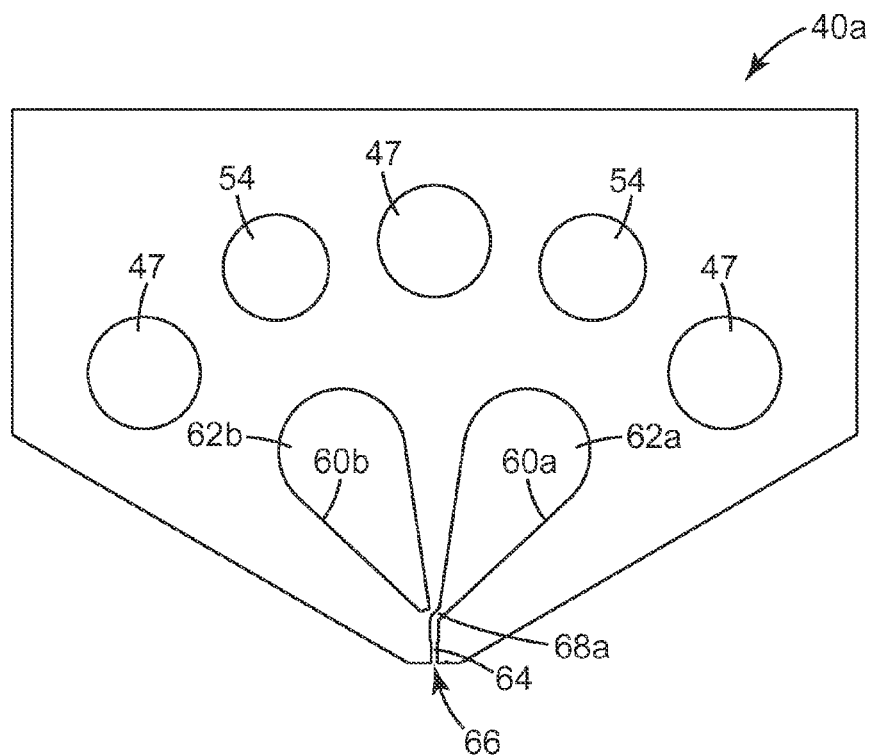
FIG. 2 is a plan view of one of the shims of FIG. 1.

Referring now to FIG. 2, a plan view of shim 40a from FIG. 1 is illustrated. Shim 40a has first aperture 60a and second aperture 60b. When extrusion die 30 is assembled, first apertures 60a in shims 40 together define at least a portion of first cavity 62a. Similarly, second apertures 60b in shims 40 together define at least a portion of second cavity 62b. Material to be extruded conveniently enters first cavity 62a via inlet port 50a, while material to be extruded conveniently enters second cavity 62b via inlet port 50b. Shim 40a has die slot 64 ending in slot 66. Shim 40a further has a passageway 68a affording a conduit between first cavity 62a and die slot 64. In the embodiment of FIG. 1, shim 40b is a reflection of shim 40a, having a passageway instead affording a conduit between second cavity 62b and die slot 64.

Figure 3:
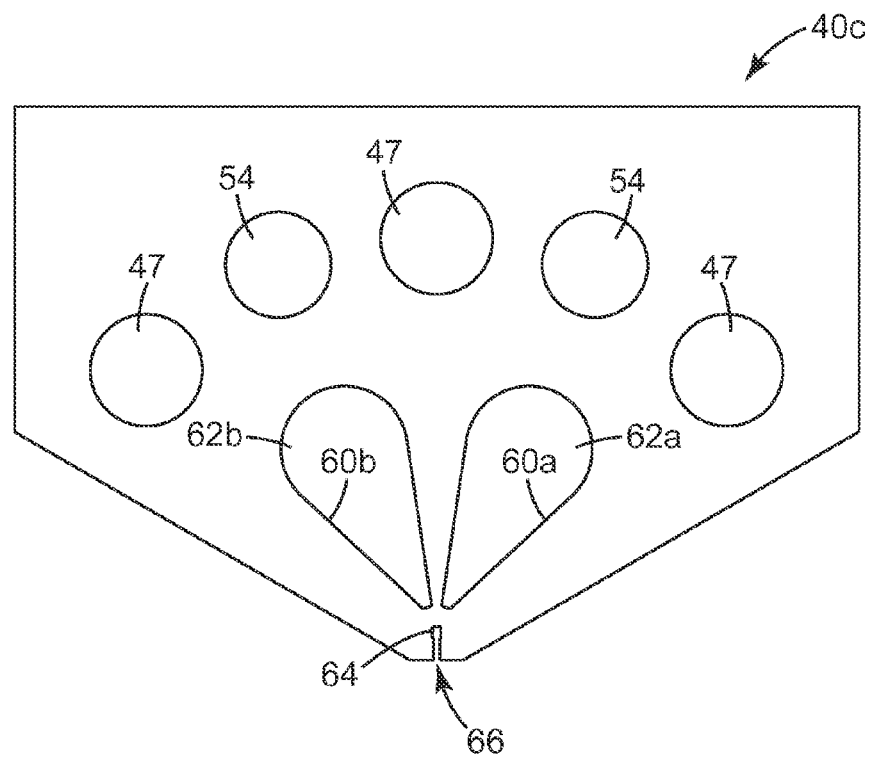
FIG. 3 is a plan view of a different one of the shims of FIG. 1.

Referring now to FIG. 3, a plan view of shim 40c from FIG. 1 is illustrated. Shim 40c has no conduit between either of first or second cavities 62a and 62b, respectively, and die slot 64.

Figure 4:
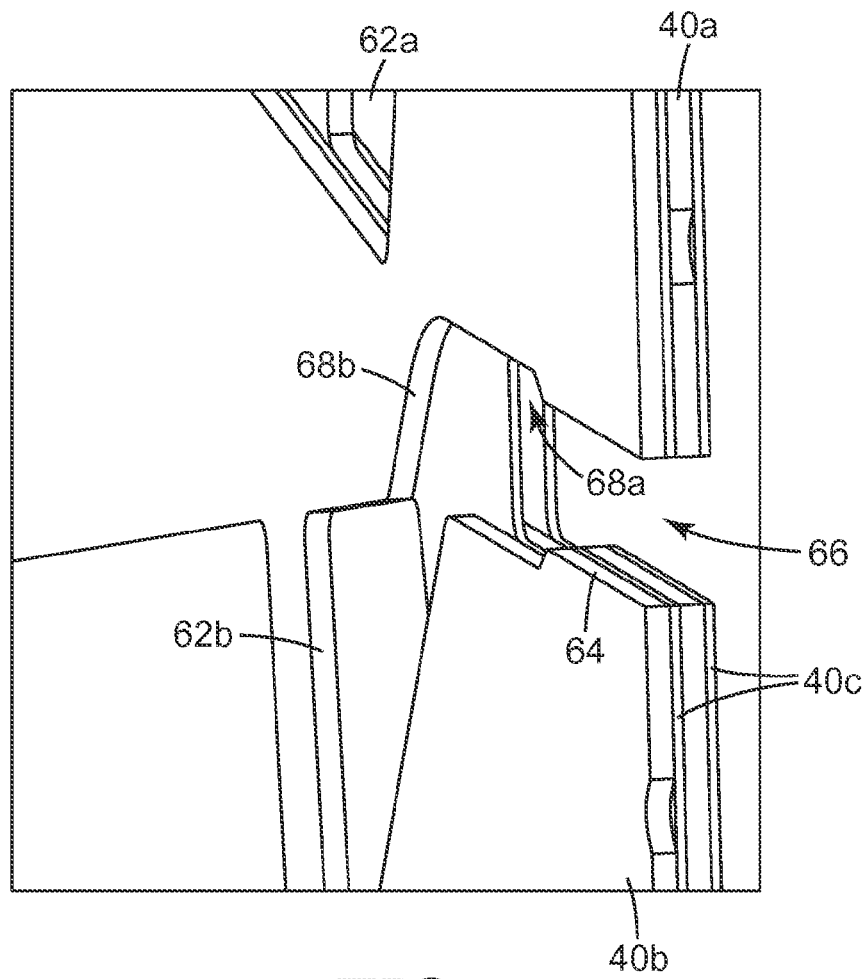
FIG. 4 is a perspective partial cutaway detail view of a segment of die slot of the assembled die according to FIG. 1, showing four adjacent shims which together form a repeating sequence of shims.

Referring now to FIG. 4, a perspective partial cutaway detail view of a segment of die slot assembled die similar to die 30 of FIG. 1 according to FIG. 1, showing four adjacent shims which together conveniently form a repeating sequence of shims, is illustrated. First in the sequence from left to right as the view is oriented is shim 40b. In this view, passageway 68b, which leads to a portion of cavity 62b, can be seen. Second in the sequence is a spacer shim 40c. Third in the sequence is shim 40a. Although not visualized in FIG. 4, shim 40a has passageway 68a, leading upwards as the drawing is oriented, providing a conduit with first cavity 62a. Fourth in the sequence is second spacer shim 40c. When die 30 is assembled with shims of this type in this way, and two flowable polymer containing compositions are introduced under pressure to cavities 62a and 62b, then co-extruded composite layer generally as depicted in FIG. 5 is produced.

Figure 5:
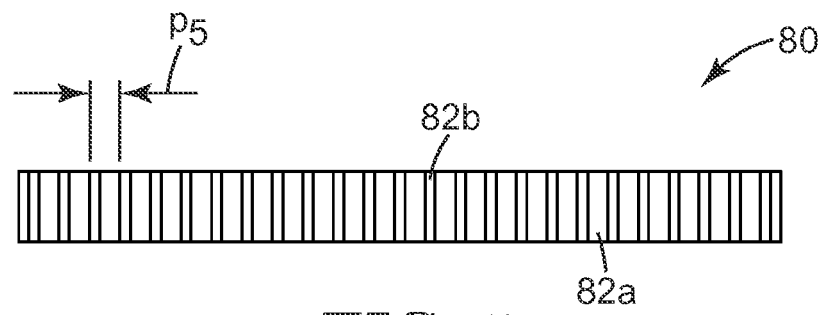
FIG. 5 is a cross-section view of a composite layer produced by a die assembled as depicted in FIG. 4, the section line being in the cross-web direction.

Referring now to FIG. 5, a cross-section view of a composite layer produced by a die assembled as depicted in FIG. 4 is illustrated. The section line for FIG. 5 is in the cross-web direction of the finished composite layer. Composite layer 80 has sharply vertical stripes of alternating materials, material 82a having been dispensed from cavity 62a, and material 82b having been dispensed from cavity 62b in FIG. 4.

Figure 6:
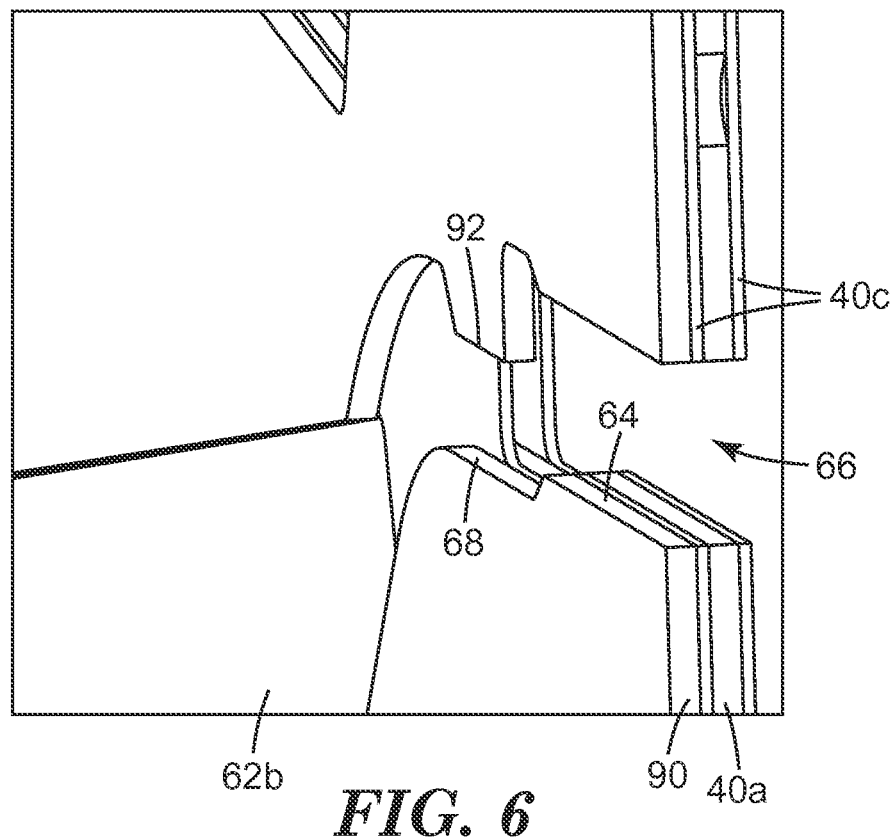
FIG. 6 is a perspective partial cutaway detail view of a segment of die slot of the assembled die, similar to FIG. 4, but showing four adjacent shims which together form a different repeating sequence of shims.

Referring now to FIG. 6, a perspective partial cutaway detail view of a segment of die slot assembled similar to die 30 of FIG. 1 is illustrated. It is similar to FIG. 4 in that it shows four adjacent shims which together conveniently form a repeating sequence of shims, but in this embodiment shim 40b of FIG. 4 has been replaced by shim 90. Like shim 40b of FIG. 4, shim 90 has passageway 68 which leads to a portion of cavity 62b. However, shim 90 has a flow restriction 92 which reduces the area through which passageway 68 can empty into die slot 64. When a die similar to die 30 is assembled with shims of this type in this way, and two flowable polymer containing compositions are introduced under pressure to cavities 62a and 62b, then co-extruded composite layer generally as depicted in FIG. 7 is produced.

Referring now to FIG. 7, a cross-section view of a composite layer produced by a die assembled as depicted in FIG. 6 is illustrated. As in FIG. 5, the section line is in the cross-web direction of the finished composite layer. Composite layer 94 has repeating vertical regions of material 96b, having been dispensed from cavity 62b. These regions of material 96b are partially enclosed in material 96a, such that areas of material 96b are exposed on first major surface 98 of composite layer 94 and not exposed on second major surface 100 of composite layer 94.

Figure 8:
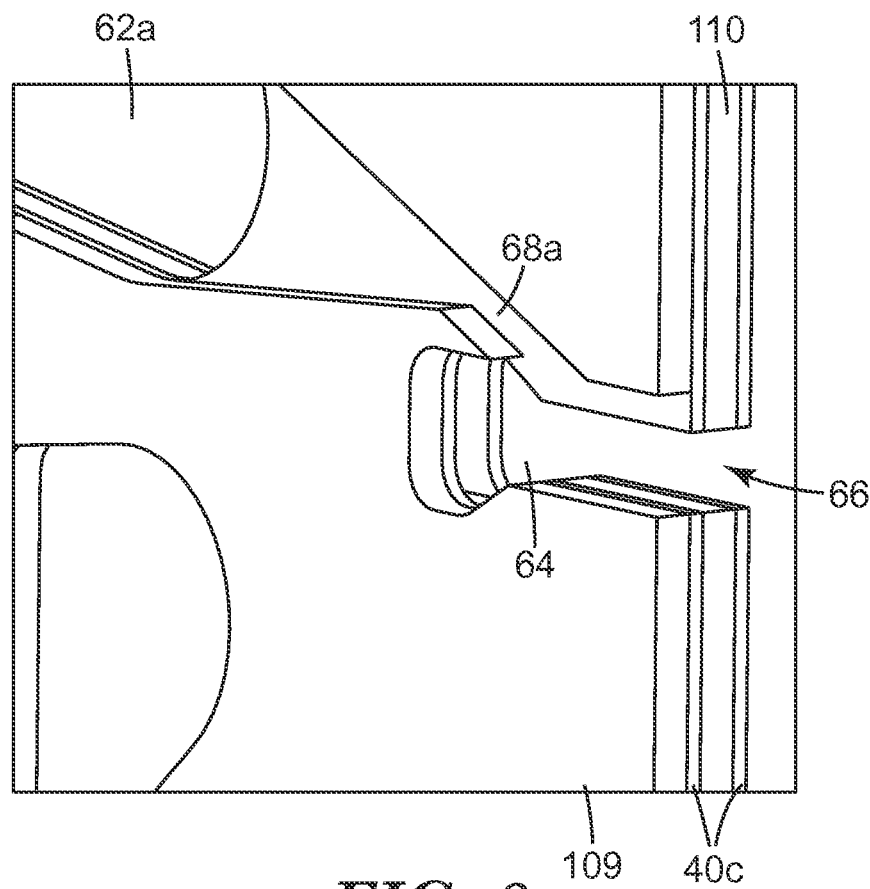
FIG. 8 is a perspective partial cutaway detail view of a segment of die slot of the assembled die, similar to FIG. 4, but showing four adjacent shims which together form a different repeating sequence of shims.

Referring now to FIG. 8, a perspective partial cutaway detail view of a segment of die slot of an assembled die similar to die 30 of FIG. 1 is illustrated. It is similar to FIG. 4 in that it shows four adjacent shims which together conveniently form a repeating sequence of shims. First in the sequence from left to right as the view is oriented is shim 109. In this view, passageway 68a which leads to a portion of cavity 62a, can be seen. Second in the sequence is spacer shim 40c. Third in the sequence is shim 110. Although not shown in FIG. 8, shim 110 has passageway 68b, leading downwards as the drawing is oriented, providing a conduit with second cavity 62b. Fourth in the sequence is second spacer shim 40c. The embodiment illustrated here stands for the proposition that the slot 66 need not be of equal height for all the shims. As will be noted with more particularity in FIG. 9, described below, the material flowing into first cavity 62a will create a series of ribs 114a extending upward from a surface formed from the material 114b extruded from cavity 62b. When a die similar to die 30 is assembled with shims of this type in this way, and two flowable polymer containing compositions are introduced under pressure to cavities 62a and 62b, then co-extruded composite layer 112, generally as depicted in FIG. 9 is produced.

Figure 9:
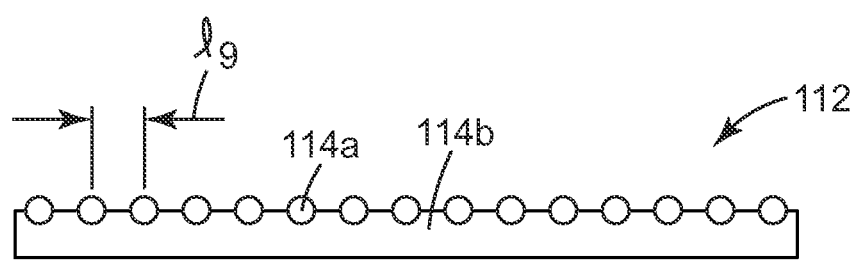
FIG. 9 is a cross-section view of a composite layer produced by a die assembled as depicted in FIG. 8, the section line being in the cross-web direction.

Referring now to FIG. 9, a cross-section view of a composite layer produced by a die assembled as depicted in FIG. 8 is illustrated. The section line for FIG. 9 is in the cross-web direction of the finished composite layer. Composite layer 112 has repeating regions of material 114a that form ribs on composite layer 114b.

Figure 10:
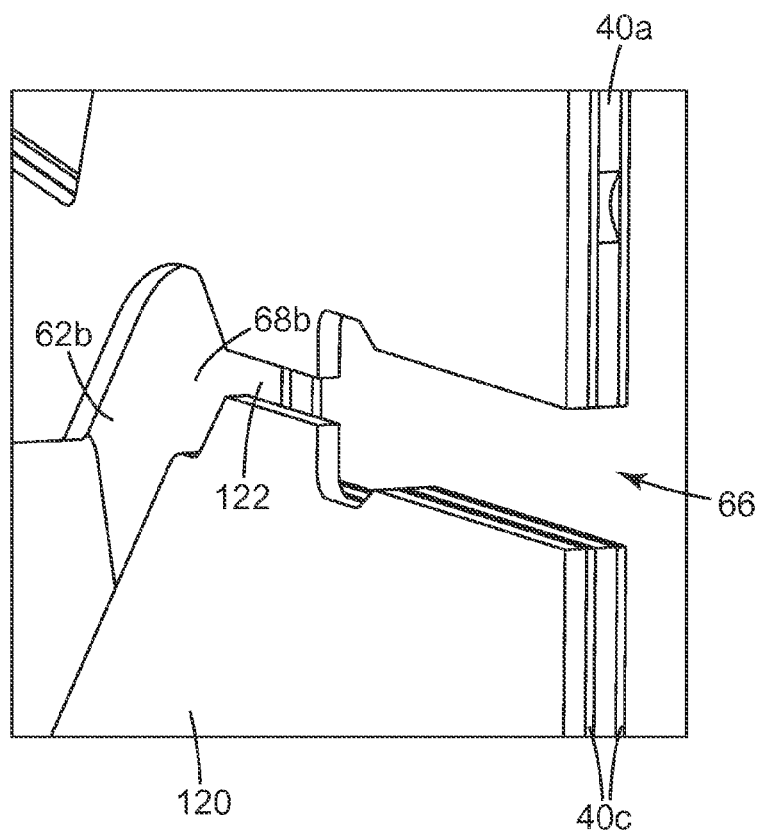
FIG. 10 is a perspective partial cutaway detail view of a segment of die slot of the assembled die, similar to FIG. 4, but showing four adjacent shims which together form a different repeating sequence of shims.

Referring now to FIG. 10, a perspective partial cutaway detail view of a segment of die slot assembled die similar to die 30 of FIG. 1 is illustrated. It is similar to FIG. 4 in that it shows four adjacent shims which together conveniently form a repeating sequence of shims. First in the sequence from left to right as the view is oriented is shim 120. In this view, passageway 68b which leads to a portion of cavity 62b, can be seen. Particularly to be noted is that the portion of the passageway 68b and die slot 64 provided by shim 120 has a narrowed passage 122 displaced from both edges of the distal opening 66. Second in the sequence is spacer shim 40c. Third in the sequence is shim 40a. Although not visualized in FIG. 10, shim 40a has passageway 68a, leading upwards as the drawing is oriented, providing a conduit with first cavity 62a. Fourth in the sequence is a second spacer shim 40c. When a die similar to die 30 is assembled with shims of this type in this way, and two flowable polymer containing compositions are introduced under pressure to cavities 62a and 62b, co-extruded composite layer 140, generally as depicted in FIG. 11 is produced.

Figure 11:
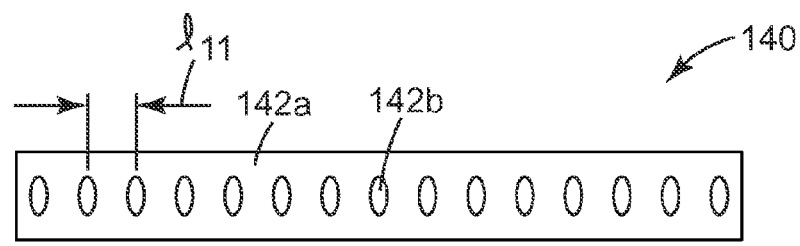
FIG. 11 is a cross-section view of a composite layer produced by a die assembled as depicted in FIG. 10, the section line being in the cross-web direction.

Referring now to FIG. 11, a cross-section view of a composite layer produced by a die assembled as depicted in FIG. 10 is illustrated. The section line for FIG. 11 is in the cross-web direction of the finished composite layer. Composite layer 140 has repeating regions of material 142b completely enclosed by material 142a.

Figure 11A:
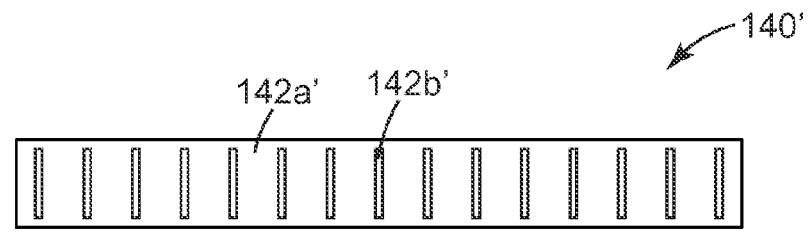
FIG. 11A is a cross-section view of a composite layer similar to the composite layer of FIG. 11.

Referring now to FIG. 11A, a cross-section view of a composite layer 140' is illustrated. Composite layer 140' is similar to composite layer 140 of FIG. 11, except that repeating regions of material 142b' reaches closer to the surface of the layer. This is conveniently done by a die similar to that illustrated in FIG. 10, except that narrowed passage 122 is not quite so narrowed. Film according to FIG. 11A is well adapted for, for example, privacy film, since the exposed major surfaces of the composite layer 140' can be treated by, for example, calendaring, to make it smoother and optically clearer without distorting repeating regions 142b'.

Figure 12:
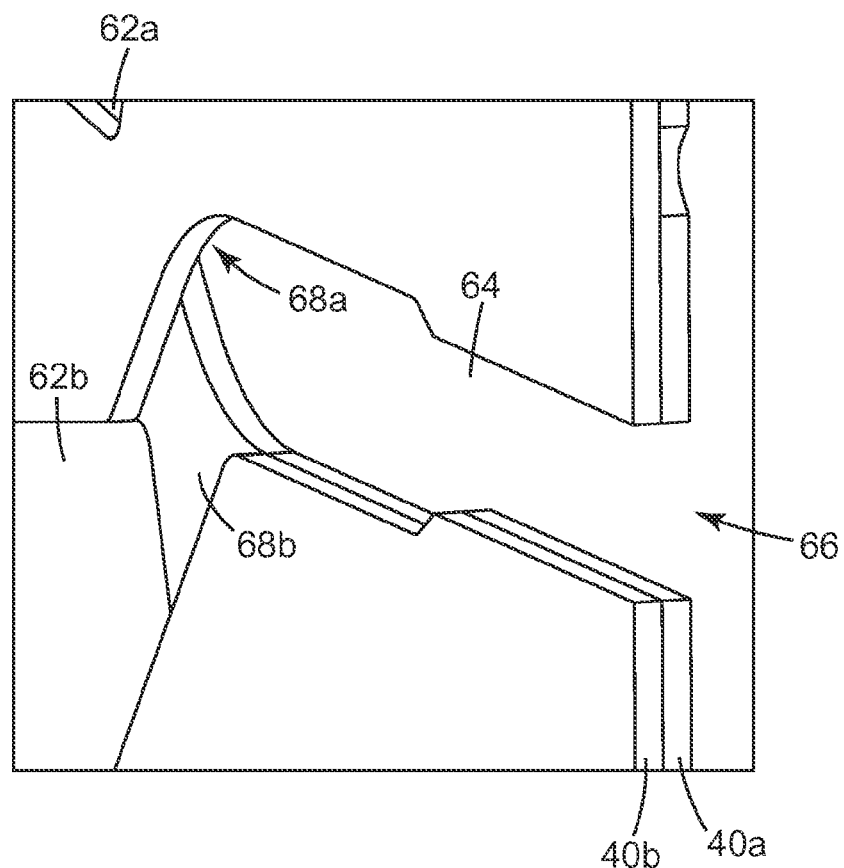
FIG. 12 is a perspective partial cutaway detail view of a segment of die slot of the assembled die, similar to FIG. 4, but showing an assembly where only two shims together form a repeating sequence of shims.

Referring now to FIG. 12, a perspective partial cutaway detail view of a segment of die slot assembled die 30 is illustrated. It is similar to FIG. 4 in that it shows adjacent shims which together conveniently form a repeating sequence of shims. However, in this Figure only two shims together form a repeating sequence of shims; this embodiment has no spacer shims. First in the sequence from left to right as the view is oriented is shim 40b. In this view, passageway 68b which leads to a portion of cavity 62b, can be seen. Second in the sequence is a shim 40a. Although not visualized in FIG. 12, shim 40a has passageway 68a, leading upwards as the drawing is oriented, providing a conduit with second cavity 62a. When a die similar to die 30 is assembled with shims of this type in this way, and two flowable polymer containing compositions are introduced under pressure to cavities 62a and 62b, then co-extruded composite layer 150, generally as depicted in FIG. 13 is produced.

Figure 13:
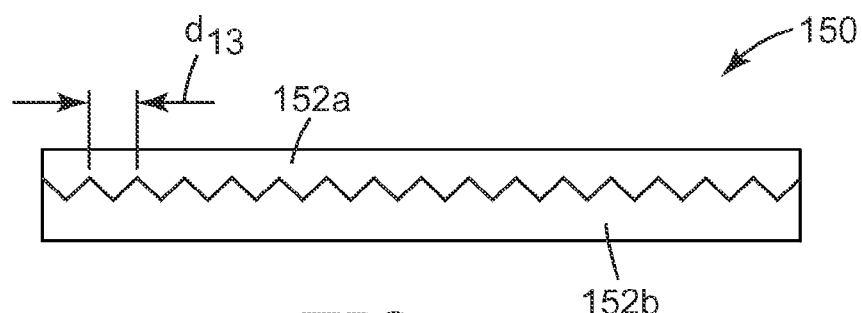
FIG. 13 is a cross-section view of a composite layer produced by a die assembled as depicted in FIG. 12, the section line being in the cross-web direction.

Referring now to FIG. 13, a cross-section view of a composite layer produced by a die assembled as depicted in FIG. 12 is illustrated. The section line for FIG. 13 is in the cross-web direction of the finished composite layer. Composite layer 150 has two layers of material 152a and 152b, such that the interface between them has a prismatic topology. Such constructions may have useful optical properties, either while the composite layer remains whole, or after the two layers have been stripped apart from each other. This construction is also useful as an adhesive and release material, wherein a structured adhesive (152a) is exposed when the release layer (152b) is removed.

Figure 14:
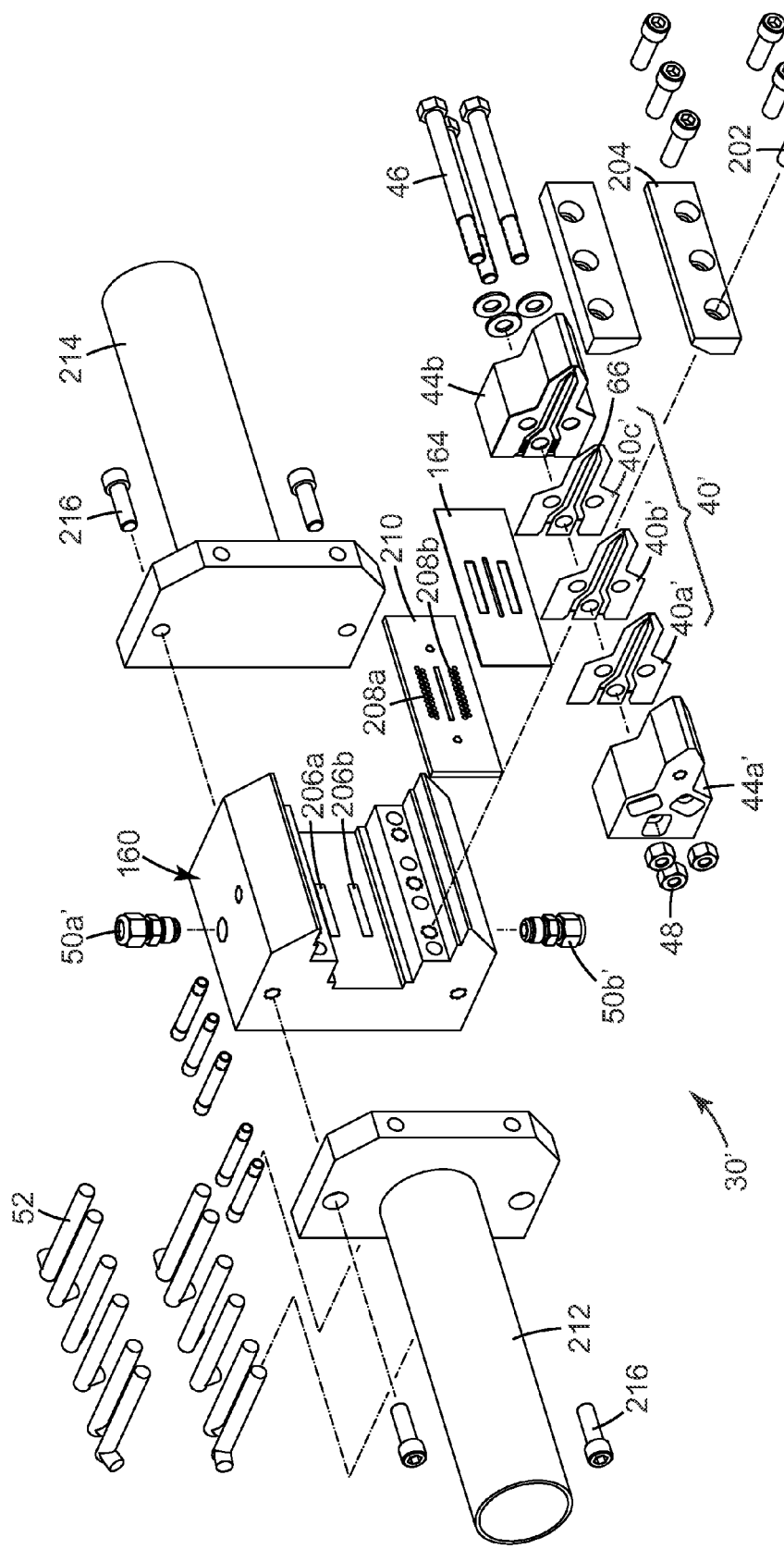
FIG. 14 is an exploded perspective view of an alternate exemplary embodiment of an extrusion die according to the present disclosure, wherein the plurality of shims, a set of end blocks, bolts for assembling the components, and inlet fittings for the materials to be extruded are clamped into a manifold body.

Referring now to FIG. 14, a perspective exploded view of an alternate embodiment of extrusion die 30' according to the present disclosure is illustrated. Extrusion die 30' includes plurality of shims 40'. In the depicted embodiment, there are a large number of very thin shims 40', of diverse types (shims 40a', 40b', and 40c'), compressed between two end blocks 44a' and 44b'. Conveniently, through bolts 46 and nuts 48 are used to assemble the shims 40' to the end blocks 44a' and 44b'.

In this embodiment, the end blocks 44a' and 44b' are fastened to manifold body 160, by bolts 202 pressing compression blocks 204 against the shims 40' and the end blocks 44a' and 44b'. Inlet fittings 50a' and 50b' are also attached to manifold body 160. These are in a conduit with two internal manifolds, of which only the exits 206a and 206b are visible in FIG. 14. Molten polymeric material separately entering body 160 via inlet fittings 50a' and 50b' pass through the internal manifolds, out the exits 206a and 206b, through passages 208a and 208b in alignment plate 210 and into openings 168a and 168b (seen in FIG. 15).

An expansion seal 164 is disposed between the shims 40' and the alignment plate 210. Expansion seal 164, along with the shims 40' together define the volume of the first and the second cavities (62a and 62b in FIG. 15). The expansion seal withstands the high temperatures involved in extruding molten polymer, and seals against the possibly slightly uneven rear surface of the assembled shims 40'. Expansion seal 164 may made from copper, which has a higher thermal expansion constant than the stainless steel conveniently used for both the shims 40' and the manifold body 160. Another useful expansion seal 164 material includes a polytetrafluoroethylene (PTFE) gasket with silica filler (available from Garlock Sealing Technologies, Palmyra, N.Y., under the trade designation "GYLON 3500" and "GYLON 3545").

Cartridge heaters 52 may be inserted into body 160, conveniently into receptacles in the back of manifold body 160 analogous to receptacles 54 in FIG. 1. It is an advantage of the embodiment of FIG. 14 that the cartridge heaters are inserted in the direction perpendicular to slot 66, in that it facilitates heating the die differentially across its width. Manifold body 160 is conveniently gripped for mounting by supports 212 and 214, and is conveniently attached to manifold body 160 by bolts 216.

Figure 15:
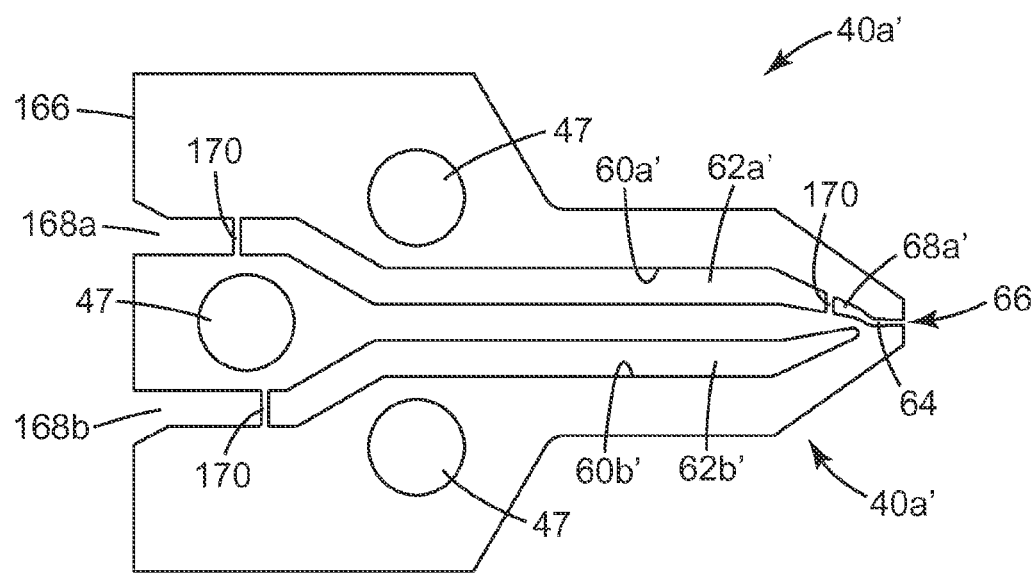
FIG. 15 is a plan view of one of the shims of FIG. 14, and relates to FIG. 14 in the same way FIG. 2 relates to FIG. 1.

Referring now to FIG. 15, a plan view of shim 40a' from FIG. 14 is illustrated. Shim 40a' has first aperture 60a' and second aperture 60b'. When extrusion die 30' is assembled, first apertures 60a' in shims 40' together define at least a portion of first cavity 62a'. Similarly, second apertures 60b' in shims 40' together define at least a portion of first cavity 62a'. Base end 166 of shim 40a' contacts expansion seal 164 when extrusion die 30' is assembled. Material to be extruded conveniently enters first cavity 62a via apertures in expansion seal 164 and via shim opening 168a. Similarly, material to be extruded conveniently enters first cavity 62a via apertures in expansion seal 164 and via shim opening 168a.

Shim 40a' has die slot 64 ending in slot 66. Shim 40a' further has passageway 68a' affording a conduit between first cavity 62a' and die slot 64. In the embodiment of FIG. 14, shim 40b' is a reflection of shim 40a', having a passageway instead affording a conduit between second cavity 62b' and die slot 64. It might seem that strength members 170 would block the adjacent cavities and passageways, but this is an illusion—the flow has a route in the perpendicular-to-the-plane-of-the-drawing dimension when extrusion die 30' is completely assembled.

Figure 16:
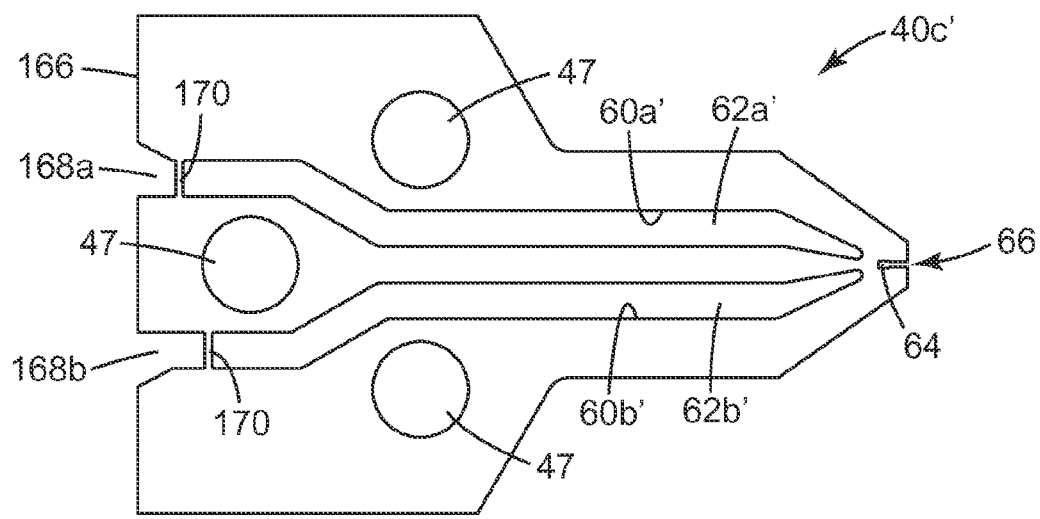
FIG. 16 is a plan view of a different one of the shims of FIG. 14, and relates to FIG. 14 in the way FIG. 3 relates to FIG. 1.

Referring now to FIG. 16, a plan view of shim 40c' from FIG. 14 is illustrated. Shim 40c' has no conduit between either of first or the second cavities 62a' and 62b', respectfully, and die slot 64.

Figure 17:
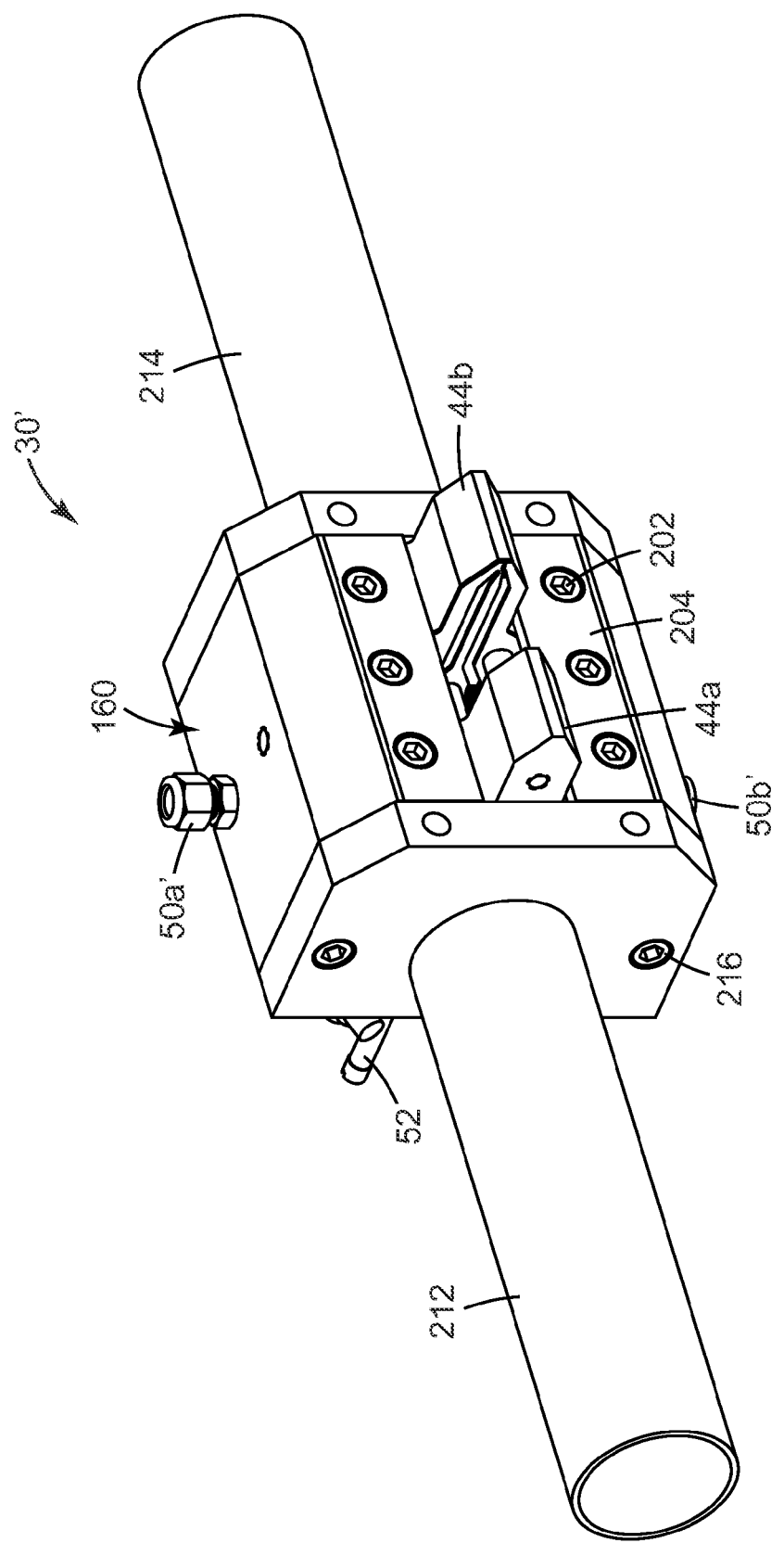
FIG. 17 is a perspective view of the embodiment of FIG. 14 as assembled.

Referring now to FIG. 17, a perspective view of the extrusion die 30' of FIG. 14 is illustrated in an assembled state, except for most of the shims 40' which have been omitted to allow the visualization of internal parts. Although the embodiment of FIG. 14 and FIG. 17 is more complicated than the embodiment of FIG. 1, it has several advantages. First, it allows finer control over heating. Second, the use of manifold body 160 allows shims 40' to be center-fed, increasing side-to-side uniformity in the extruded film. Third, the forwardly protruding shims 40' allow distal opening 66 to fit into tighter locations on crowded production lines. The shims are typically 0.05 mm (2 mils) to 0.25 mm (10 mils) thick, although other thicknesses, including, for example, those from 0.025 mm (1 mil) to 1 mm (40 mils) may also be useful. Each individual shim is generally of uniform thickness, preferably with less than 0.005 mm (0.2 mil), more preferably, less than 0.0025 mm (0.1 mil) in variability.

The shims are typically metal, preferably stainless steel. To reduce size changes with heat cycling, metal shims are preferably heat-treated.

The shims can be made by conventional techniques, including wire electrical discharge and laser machining Often, a plurality of shims are made at the same time by stacking a plurality of sheets and then creating the desired openings simultaneously. Variability of the flow channels is preferably within 0.025 mm (1 mil), more preferably, within 0.013 mm (0.5 mil).

Suitable polymeric materials for extrusion from dies described herein, methods described herein, and for composite layers described herein include thermoplastic resins comprising polyolefins (e.g., polypropylene and polyethylene), polyvinyl chloride, polystyrene, nylons, polyesters (e.g., polyethylene terephthalate) and copolymers and blends thereof. Suitable polymeric materials for extrusion from dies described herein, methods described herein, and for composite layers described herein also include elastomeric materials (e.g., ABA block copolymers, polyurethanes, polyolefin elastomers, polyurethane elastomers, metallocene polyolefin elastomers, polyamide elastomers, ethylene vinyl acetate elastomers, and polyester elastomers). Exemplary adhesives for extrusion from dies described herein, methods described herein, and for composite layers described herein include acrylate copolymer pressure sensitive adhesives, rubber based adhesives (e.g., those based on natural rubber, polyisobutylene, polybutadiene, butyl rubbers, styrene block copolymer rubbers, etc.), adhesives based on silicone polyureas or silicone polyoxamides, polyurethane type adhesives, and polyvinyl ethyl ether), and copolymers or blends of these. Other desirable materials include, for example, styrene-acrylonitrile, cellulose acetate butyrate, cellulose acetate propionate, cellulose triacetate, polyether sulfone, polymethyl methacrylate, polyurethane, polyester, polycarbonate, polyvinyl chloride, polystyrene, polyethylene naphthalate, copolymers of blends based on naphthalene dicarboxylic acids, polyolefins, polyimides, mixtures and/or combinations thereof. Exemplary release materials for extrusion from dies described herein, methods described herein, and for composite layers described herein include silicone-grafted polyolefins such as those described in U.S. Pat. No. 6,465,107 (Kelly) and U.S. Pat. No. 3,471,588 (Kanner et al.), silicone block copolymers such as those described in PCT Publication No. WO96039349, published Dec. 12, 1996, low density polyolefin materials such as those described in U.S. Pat. No. 6.228.449 (Meyer), U.S. Pat. No. 6,348,249 (Meyer), and U.S. Pat. No. 5,948.517 (Adamko), the disclosures of which are incorporated herein by reference.

In some embodiments, the first and second polymeric materials each have a different refractive index (i.e., one relatively higher to the other).

In some embodiments, then first and/or second polymeric material comprises a colorant (e.g., pigment and/or dye) for functional (e.g., optical effects) and/or aesthetic purposes (e.g., each has different color/shade). Suitable colorants are those known in the art for use in various polymeric materials. Exemplary colors imparted by the colorant include white, black, red, pink, orange, yellow, green, aqua, purple, and blue. In some embodiments, it is desirable level to have a certain degree of opacity for the first and/or second polymeric material. The type of colorants used and the desired degree of opacity, as well as, for example, the size and shape of the particular zone of the composite article effects the amount of colorant used. The amount of colorant(s) to be used in specific embodiments can be readily determined by those skilled in the (e.g., to achieve desired color, tone, opacity, transmissivity, etc.). If desired, the first and second polymeric materials may be formulated to have the same or different colors.

More specifically, for example, for embodiments such as generally shown in FIG. 5, desirable polymers include polyolefin elastomers (e.g., from Dow Chemical, Midland, Mich., under the trade designation "ENGAGE" and Clarified Polypropylene Random copolymer (e.g., from Lyondell Basell Industries, Rotterdam, The Netherlands, under the trade designation "PROFAX"). Other desirable materials include, for example, styrene-acrylonitrile copolymers, cellulose acetate butyrate polymers, cellulose acetate propionate polymers, cellulose triacetate polymers, polyether sulfone polymers, polymethyl methacrylate polymers, polyurethane polymers, polyesters, polycarbonate polymers, polyvinyl chloride polymers, polystyrene polymers, polyethylene naphthalate polymers, copolymers or blends based on naphthalene dicarboxylic acids, polyolefins, polyimides, mixtures and/or combinations thereof.

More specifically, for example, for embodiments such as generally shown in FIG. 7, desirable polymers include an acrylate copolymer pressure sensitive adhesive composed of 93% ethyl hexyl acrylate monomer and 7% acrylic acid monomer (made as generally described in U.S. Pat. No. 2,884,126 (Ulrich)) for partially enclosed in material 96a, and a polyethylene polymer (available, for example, from ExxonMobil Chemical Company, Houston, Tex., under the trade designation "EXACT 3024") for repeating vertical regions 96b. The above polyethylene polymer can also be replaced by another adhesive with lower level of tack. An example include an acrylate copolymer pressure sensitive adhesive composed of 96% hexyl acrylate monomer and 4% acrylic acid monomer so a less tacky adhesive is used for the same repeating vertical regions 96b.

Another acrylate copolymer pressure sensitive adhesive that may be desirable for repeating regions of material 114a is the adhesive used as generally prepared the blown microfiber-acrylate-PSA web (Adhesive 1) in the Examples of U.S. Pat. No. 6,171,985 (Joseph et al), the disclosure of which is incorporated herein by reference, which is an isooctyl acrylate/acrylic acid/styrene macromer copolymer (IOA/AA/Sty, 92/4/4), prepared as generally described in Example 2 of U.S. Pat. No. 5,648,166 (Dunshee), the disclosure of which is incorporated herein by reference.

More specifically, for example, for embodiments such as generally shown in FIG. 9, desirable polymers include an acrylate copolymer pressure sensitive adhesive composed of 93% ethyl hexyl acrylate monomer and 7% acrylic acid monomer (made as generally described in U.S. Pat. No. 2,884,126 (Ulrich)) for repeating regions of material 114a, and a polyethylene polymer (available, for example, from ExxonMobil Chemical Company under the trade designation "EXACT 3024") for ribs 114b. Another acrylate copolymer pressure sensitive adhesive that may be desirable for repeating regions of material 114a is the adhesive used as generally prepared the blown microfiber-acrylate-PSA web (Adhesive 1) in the Examples of U.S. Pat. No. 6,171,985 (Joseph et al), the disclosure of which is incorporated herein by reference, which is an isooctyl acrylate/acrylic acid/styrene macromer copolymer (IOA/AA/Sty, 92/4/4), prepared as generally described in Example 2 of U.S. Pat. No. 5,648,166 (Dunshee), the disclosure of which is incorporated herein by reference.

More specifically, for example, for embodiments such as shown in FIG. 13, desirable polymers include an acrylate copolymer pressure sensitive adhesive composed of 93% ethyl hexyl acrylate monomer and 7% acrylic acid monomer (made as generally described in U.S. Pat. No. 2,884,126 (Ulrich)) (152*a*), and a polyethylene polymer (available, for example, from ExxonMobil Chemical Company, Houston, Tex., under the trade designation "EXACT 3024") (152*b*).

In some embodiments, the first and/or second polymeric materials comprise adhesive material. In some embodiments, the first adhesive material has a first release, and the second adhesive material has a second release, wherein the first and second release have different release properties.

Exemplary uses for embodiments such as generally shown in FIGS. 5, 11, and 11A include document privacy articles or shields, constructions having two different adhesive materials, and light control films also known as light collimating film, which is an optical film that is configured to regulate the transmission of light. Light control films typically include a light transmissive film having a plurality of parallel grooves wherein the grooves are formed of a light-absorbing material. Light control films can be placed proximate a display surface, image surface, or other surface to be viewed. Typically, at normal incidence, (i.e., 0 degree viewing angle) where a viewer is looking at an image through the light control film in a direction that is perpendicular to the film surface, the image is viewable. As the viewing angle increases, the amount of image light transmitted through the light control film decreases until a viewing cutoff angle is reached where substantially all the image light is blocked by the light-absorbing material and the image is no longer viewable. This can provide privacy to a viewer by blocking observation by others that are outside a typical range of viewing angles. The viewing angle can be further modified by having clear zones at two different lengths of clear zones. As a result of the two lengths of clear zones, the viewing cutoff angle is seen at two different angles.

To provide desired privacy effect, one of the first and second zones is typically transparent and the other zone is non-transparent. By transparent is meant that the respective zone is sufficiently transmissive to visible light to permit an observer to read underlying material through the respective zone with the unaided human eye. The other, non-transparent, zone is translucent or even preferably opaque (i.e., it is insufficiently transmissive to visible light to permit an observer to read underlying material through the respective zone with the unaided human eye).

As mentioned above, embodiments of composite layers produced with the dies and method described herein are well suited for use in document privacy articles or shields which as used herein refer to articles adapted to be used with a document (e.g., a sheet or stack of sheets of paper with indicia thereon), a credit card, etc., to permit the document to be seen from selected viewing orientations (e.g., by a passenger (i.e., the intended reader), seated in an airplane, but not from other view positions (e.g., by a fellow passenger on in an adjacent seat)). The privacy article is adapted to be used with the document (e.g., cut to convenient size to be laid on the face of a document, provided with an optional cavity to receive the document, provided with an optional clip or adhesive to be secured to the document, etc. in such a manner that the face of the document can be seen through the composite layer from the selected viewing orientation. In some instances the privacy article will consistent essentially of the composite layer, in other instances the privacy article may comprise additional components or members where the composite layer constitutes a privacy panel providing the selective viewing orientation described herein.

One exemplary use of composite layer 80 shown in FIG. 5 or composite layer 140 shown in FIG. 11, for example, is a rectangular sheet wherein material 82*a*, 142*a*, respectively, is a substantially transparent polymer and material 82*b*, 142*b*, respectively, is opaque. Such a layer can be used as a privacy article. By substantially transparent is meant that polymer permits light to be transmitted therethrough such that an observer can look through material 82*a*, 142*a*, respectively, to see matter on the opposite side of the composite layer (e.g., read a document on which the composite layer has been placed).

Using embodiments of composite layers described herein, privacy articles can be made in a variety of desired configurations. Privacy articles described herein comprise, and may consist essentially of, composite layers described herein. For instance, composite layer 80 can be formed in or cut to a convenient size (e.g., the size of letter, legal or A4 paper), and then simply laid over a paper and used as a personal privacy article while reading the paper. In most typical embodiments of this application, the machine direction of the composite layer 80 or composite layer 140 will be oriented to parallel the long direction of the paper if the paper is printed in conventional portrait orientation (and as will be understood, perpendicularly thereto if the privacy article is intended to be used with documents printed in landscape format). In this manner, the privacy article permits the document to be read by the person holding it but prevents the document from being read by persons sitting adjacent to the reader (e.g., fellow passengers on an airplane). As will be understood, control of the range of the viewing zone through which an underlying document can be read can be readily controlled by selecting the magnitude of the width of the substantially transparent material 82*a*, 142*a*, respectively, and, perpendicular thereto, the height of opaque material 82*b*, 142*b*, respectively. Using wider substantially transparent material 82*a*, 142*a*, respectively, will result in wider orientations through which the underlying document may be read (and thus lessened privacy) whereas using greater height of opaque material 82*b*, 142*b*, respectively, will result in narrower orientation through which the underlying document may be read (and thus increased privacy). Those skilled in the art will be able to readily select materials and configurations for composite films described herein to result in desired performance.

In some embodiments, the privacy article will be substantially continuous. In other embodiments the article may have openings or cut out portions therein. For instance, some embodiments may be made with a narrow cut-out portion running partially across the sheet in the cross direction that permits direct access to the underlying document (e.g., allowing marking of the document with a writing instrument such as a pen or highlighter without completely unshielding the document).

Figure 18:
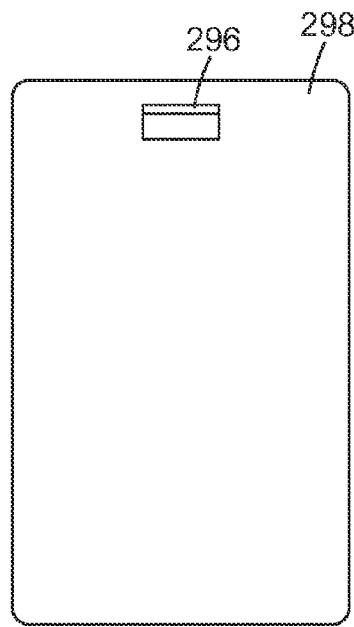
FIG. 18 is a plan view of an illustrative privacy article having a clamp for securing the document to be protected.

Referring now to FIG. 18, an exemplary privacy article is illustrated. A clamp 296 is attached to the bottom side of sheet 298 of composite layer 80 shown in FIG. 5 or composite layer 140 shown in FIG. 11. Clamp 296 can releasably hold a document (not shown) to be protected in place so as to free up the user's hands. Alternatively, adhesive (not shown) (e.g., a repositionable adhesive) may be provided on the bottom side of sheet 298 to releasably secure the sheet to a document. In another embodiment in accordance with the disclosure, a composite sheet produced as described herein may be used with conventional clip board with the sheet being secured in place over the paper(s) secured on the clip board.

Illustrative examples of configurations of privacy shields or articles which may be made using composite films produced with dies described herein include simple sheets, optionally having one or more tabs, clips, etc., pockets optionally having two or more chambers, credit card holders, file folders, portfolio holders, pouches with optional closure and/or flaps, etc. When coupled with a document having indicia on a first surface thereof by positioning the composite film on (i.e., in direct contact with or in close proximity thereto in front of the first surface such that one must look through the film to read the indicia), an assembly comprising a privacy assured document is created.

Figure 19:
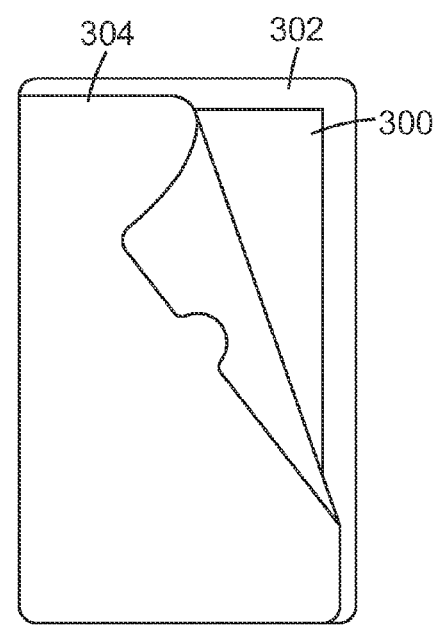
FIG. 19 is a plan view of an illustrative privacy article constructed as a pocket for receiving the document to be protected.

Referring now to FIG. 19, an exemplary privacy article is illustrated. Document 300 to be protected from prying eyes is enclosed within pocket 302, wherein a least a viewing side 304 is formed, for example, from composite layer 80 shown in FIG. 5 or composite layer 140 shown in FIG. 11. In perhaps the most convenient embodiments of this application, the machine direction of viewing side 304 is oriented to parallel the long direction of paper 300 because documents are more commonly printed in portrait orientation, although as discussed above, the composite of view side 304 may be oriented with its machine direction perpendicular to the long direction of paper 300 for use with documents printed in landscape orientation.

Figure 20:
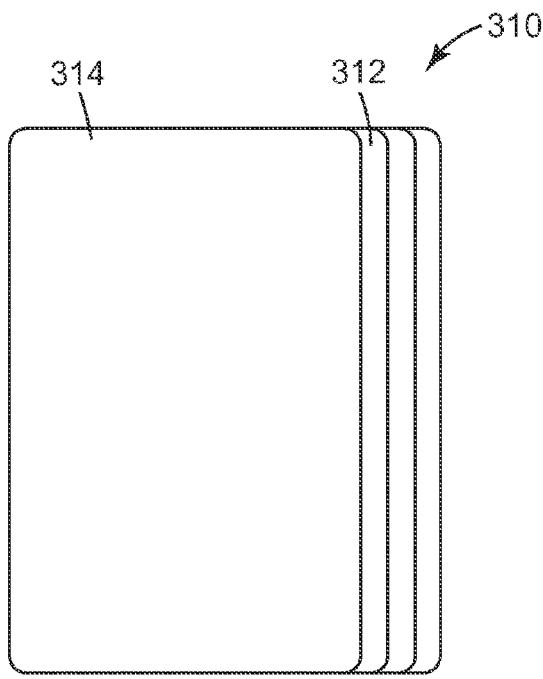
FIG. 20 is a plan view of an illustrative privacy article constructed with multiple side-by-side coextruded sheets attached at a hinge and capable of receiving multiple documents to be protected.

Referring now to FIG. 20, another exemplary privacy article is illustrated. Privacy article 310 includes multiple sheets 312 formed from composite layer 80 shown in FIG. 5 or composite layer 140 shown in FIG. 11, all of a slightly different width. These are attached together, for example, with a living hinge (i.e., a thin flexible web material that joins two relatively rigid bodies together) along side 314.

Figure 21:
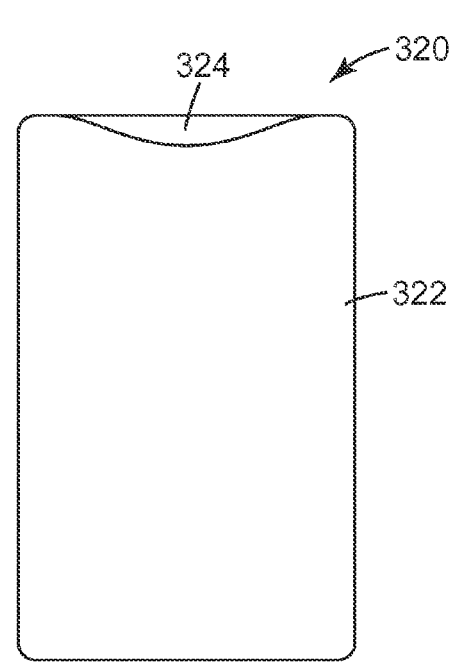
FIG. 21 is a plan view of an illustrative privacy article adapted to protect a single credit card.

Referring now to FIG. 21, another exemplary privacy article 320 is adapted to protect a credit card as illustrated. At least top surface 322, and conveniently bottom surface 324 as well is formed from composite layer 80 shown in FIG. 5 or composite layer 140 shown in FIG. 11. This construction allows the owner to read his credit card numbers while concealing them from those nearby.

Figure 22:
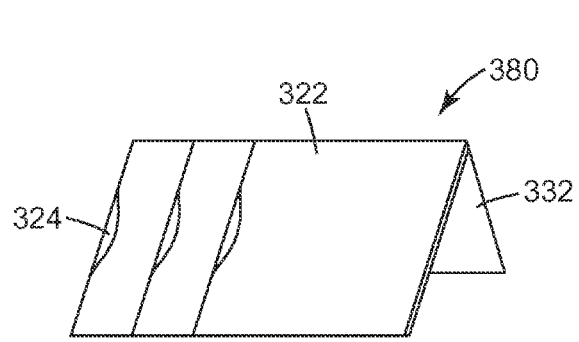
FIG. 22 is a perspective view of an illustrative privacy article adapted to protect multiple credit cards, and adapted to be received within a wallet.

Referring now to FIG. 22, another exemplary privacy article 330 is adapted to protect credit cards as illustrated, except that this embodiment holds multiple cards and is adapted by hinged support panel 332 to be received within a wallet with panel 332 fitting within the recesses commonly found in wallets for such purposes.

Figure 23:
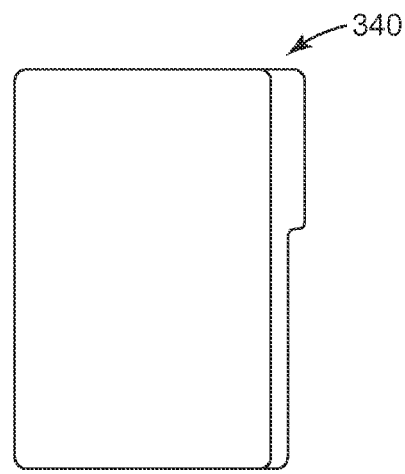
FIG. 23 is a plan view of an illustrative privacy article sized and shaped like a standard filing folder.

Referring now to FIG. 23, another exemplary privacy article 340 constructed in the shape of a conventional file folder is illustrated. The ability to discretely view the contents of the top document within article 340 can be a convenience if multiple folders are in use in a populated environment.

Figure 24:
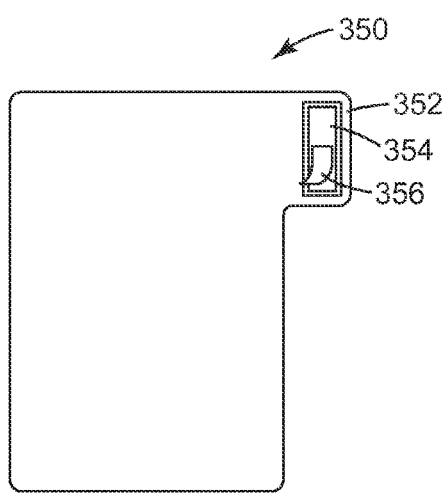
FIG. 24 is a plan view of an illustrative privacy article having a flange to support a dispenser of repositionable adhesive flags.
Figure 25:
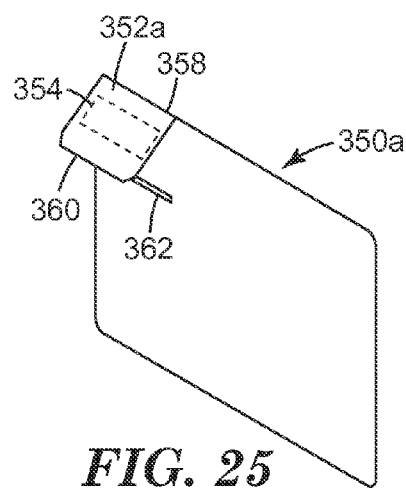
FIG. 25 is a perspective view of an alternate embodiment of the privacy article of FIG. 24.

It is contemplated that diverse flanges and/or recesses can be provided on privacy articles according to the present disclosure to improve their convenience for users. These features can accomplish that by supporting common office supply tools such as highlighter pens, paperclips, and repositionable flags. For example, and referring now to FIG. 24, privacy article 350 has an extended flange 352 with a dispenser 354 for repositionable tape flags 356 mounted thereon. A variant privacy article 350a is illustrated in FIG. 25 wherein the extended flange 352a is mounted on a living hinge 358 so that the extended flange 352a can fold with its leading edge 360 can be received in slot 362 for convenient storage.

Figure 26:
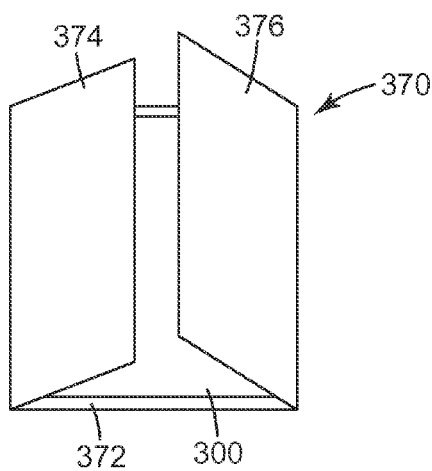
FIG. 26 is a perspective view of an illustrative 3-fold embodiment of a privacy article.

Referring now to FIG. 26, another exemplary privacy article 370 is illustrated. Privacy article 370 has a back 372 hinged to two side panels 374 and 376 which can independently open to provide quick access to document 300 (e.g., to write thereon or remove it while providing desired privacy when closed).

Those skilled in the art can make privacy articles described herein in a variety of forms. The composite extruded film produced herein may be made in flexible or rigid form as desired. If desired, the privacy article may have alphanumeric or other indicia thereon. In some embodiments, they may be provided with print receptive coatings so as to be capable of being written on. Advantages of the present disclosure include that composite films having uniform, desired privacy control properties can be made inexpensively including films that are suitable for use in secured document assemblies for many different configurations as desired Exemplary uses for embodiments such as shown generally in FIG. 7 include adhesive tapes employing two different adhesives (i.e., adhesives exhibiting two different adhesion properties) and projection screens.

Exemplary uses for embodiments such as shown generally in FIG. 9 polymers include adhesive tapes and hydrophobic/hydrophilic film constructions.

Exemplary uses for embodiments such as shown generally in FIGS. 11 and 11A include light transmission (e.g., light tubes) and privacy articles.

Exemplary uses for embodiments such as shown generally in FIG. 13 include adhesive tapes.

In some exemplary embodiments employing adhesives, with different adhesive properties (e.g., one has relatively strong adhesive characteristics, and the other relatively weak adhesive characteristics). The type of adhesive functionality could include, for example, the adhesives having the different adhesive properties be tailored together to provide various adhesions to a desire surface (e.g., to skin and/or other articles; good adhesion to plastic (e.g., PVC or other tubing, silicone). The adhesive combinations could also be tailored, for example, to be relatively gentle to skin or to remove a minimal amount of skin cells.

For example, in some exemplary constructions, one adhesive could protrude above another adhesive. For example, again referring to FIG. 9, 114b is a relatively low adhesion adhesive and 114a is a relatively high adhesion adhesive, so a user can handle the composite adhesive article without having the article stick to the hand or gloves. Once the adhesive article is in place on skin, the user can press down the article and have it securely held in place. Alternatively, for example, the adhesive could flow in place once the adhesive has been equilibrated to the same temperature as the skin temperature. The same or similar performance could be provided, for example, when two different adhesives are extruded as generally shown in FIG. 7, wherein 96a is a relatively low adhesion adhesive and 96b is a relatively high adhesion adhesive.

For curable adhesives, curing can be done using conventional techniques (e.g., thermal, UV, heat or electron beam). If the adhesive is cured by electron beam, for example, the acceleration voltage of the beam can also be set up such that the top portion of the adhesive is preferentially cured so the adhesive on the bottom maintains more of its adhesion properties.

Exemplary Embodiments

1. An extrusion die comprising a plurality of shims positioned adjacent to one another, the shims together defining a first cavity, a second cavity, and an die slot, wherein the die slot has a distal opening, wherein each of the plurality of shims defines a portion of the distal opening, wherein at least a first one of the shims that provides a passageway between the first cavity and the die slot, wherein at least a second one of the shims that provides a passageway between the second cavity and the die slot, and wherein the shims that provide a passageway between the second cavity and the die slot have first and second opposed major surfaces, and wherein said passageway extends from the first major surface to the second major surface.

2. The extrusion die of exemplary embodiment 1, further comprising a manifold body for supporting the shims, the manifold body having at least one manifold therein, the manifold having an outlet; and further comprising an expansion seal disposed so as to seal the manifold body and the shims, wherein the expansion seal defines a portion of at least one of the cavities, and wherein the expansion seal allows a conduit between the manifold and the cavity.

3. The extrusion die of exemplary embodiment 2, wherein the manifold body has at least two manifolds, wherein the second manifold is in a conduit with the other of the first or the second cavity.

4. The extrusion die of either exemplary embodiment 2 or 3, wherein the expansion seal defines a portion of both the first and the second cavities.

5. The extrusion die of any of exemplary embodiments 2 to 4, wherein the expansion seal is made of copper.

6. The extrusion die of any of exemplary embodiments 2 to 5, wherein the manifold body has receptacles oriented perpendicular to the distal opening for receiving heating elements.

7. The extrusion die of any preceding exemplary embodiment, wherein at least one of the shims is a spacer shim providing no conduit between either the first or the second cavity and the die slot.

8. The extrusion die of any preceding exemplary embodiment, further comprising a pair of end blocks for supporting the plurality of shims.

9. The extrusion die of exemplary embodiment 8, wherein each of the shims has at least one (optionally, a plurality) through-hole for the passage of connectors between the pair of end blocks.

10. The extrusion die of either exemplary embodiment 8 or 9, wherein at least one end block has an inlet port for introduction of fluid material into the first cavity.

11. The extrusion die of any preceding exemplary embodiment, wherein the plurality of shims comprises a plurality of a repeating sequence of shims comprising a shim that provides a conduit between the first cavity and the die slot and a shim that provides a conduit between the second cavity and the die slot.

12. The extrusion die of any of exemplary embodiments 1 to 10, wherein the plurality of shims comprises a plurality of a repeating sequence of shims comprising a shim that provides a conduit between the first cavity and the die slot, a spacer shim, a shim that provides a conduit between the second cavity and the die slot, and a spacer shim.

13. The extrusion die of exemplary embodiment 12, wherein the shims that provide a conduit between the first cavity and the die slot have a flow restriction compared to the shims that provides a conduit between the second cavity and the die slot.

14. The extrusion die of exemplary embodiment 12, wherein the portion of the distal opening provided by the shims that provides a conduit between the first cavity and the die slot is narrower than the portion of the distal opening provided by the shims that provide a conduit between the second cavity and the die slot.

15. The extrusion die of any of exemplary embodiments 1 to 10, wherein the plurality of shims comprises a plurality of a repeating sequence shims comprising a shim that provides a conduit between the first cavity and the die slot, a spacer shim, a shim that provides a conduit between the second cavity and the die slot, and a spacer shim, wherein the shims that provide a conduit between the second cavity and the die slot have a narrowed passage displaced from both edges of the distal opening.

16. The extrusion die of any preceding exemplary embodiment comprising at least 1000 (optionally, at least 2000, 3000, 4000, 5000, 6000, 7000, 8000, 9000, or even at least 10,000) of the shims.

17. The extrusion die of any preceding exemplary embodiment, wherein if a fluid having a viscosity of 300 Pa*s at 220° C. is extruded through the extrusion die, the fluid has a shear rate of less than 2000/sec.

18. The extrusion die of any preceding exemplary embodiment, wherein the distal opening has an aspect ratio of at least 100:1 (optionally, at least 500:1, 1000:1, 2500:1, or even at least to 5000 to 1).

19. A method of making a composite layer, the method comprising:
providing an extrusion die of any preceding exemplary embodiment;
supplying a first extrudable polymeric material into the first cavity;
supplying a second extrudable polymeric material into the second cavity; and
extruding the first and second polymeric materials through the die slot and through the distal opening to provide a composite layer.

20. The method of exemplary embodiment 19, further comprising curing the first and second polymeric materials.

21. The method of either exemplary embodiment 19 or 20, further comprising quenching the extruded first and second polymeric materials on a chilled surface.

22. The method of any of exemplary embodiments 19 to 21, wherein the first polymeric material in the first cavity is at a first pressure greater than 689 kPa.

23. The method of any of exemplary embodiments 19 to 22, wherein the second polymeric material in the second cavity is at a second pressure greater than 689 kPa.

24. The method of any of exemplary embodiments 19 to 23, wherein, by volume, the ratio of the first polymeric material passing through the distal opening to the second polymeric material passing through the distal opening is at least 5:1 (optionally 10:1, 20:1, 25:1, 50:1, 75:1, or even at least 100:1).

25. The method of any of exemplary embodiments 19 to 24, wherein the distal opening has an entrance and an exit, and wherein the first polymeric material and the second polymeric material contact each other not greater 25 mm from the entrance of the distal opening.

26. The method of any of exemplary embodiments 19 to 25, wherein the composite layer has a thickness in a range from 0.25 mm to 1 mm.

27. An extrusion die comprising a plurality of shims positioned adjacent to one another, the shims together defining a first cavity, a second cavity, and an die slot, wherein the die slot has a distal opening, wherein each of the plurality of shims defines a portion of the distal opening, wherein at least a first one of the shims provides a conduit between the first cavity and the die slot, wherein at least a second one of the shims provides a conduit between the second cavity and the die slot, and wherein if a fluid having a viscosity of 300 Pa*s at 220° C. is extruded through the extrusion die, the fluid has a shear rate of less than 2000/sec.

28. The extrusion die of exemplary embodiment 27, further comprising a manifold body for supporting the shims, the manifold body having at least one manifold therein, the manifold having an outlet; and further comprising an expansion seal disposed so as to seal the manifold body and the shims, wherein the expansion seal defines a portion of at least one of the cavities, and wherein the expansion seal allows a conduit between the manifold and the cavity.

29. The extrusion die of exemplary embodiment 28, wherein the manifold body has at least two manifolds, wherein the second manifold is in a conduit with the other of the first or the second cavity.

30. The extrusion die of either exemplary embodiment 28 or 29, wherein the expansion seal defines a portion of both the first and the second cavities.

31. The extrusion die of any of exemplary embodiments 28 to 30, wherein the expansion seal is made of copper.

32. The extrusion die of any of exemplary embodiments 28 to 31, wherein the manifold body has receptacles oriented perpendicular to the distal opening for receiving heating elements.

33. The extrusion die of any of exemplary embodiments 27 to 32, wherein at least one of the shims is a spacer shim providing no conduit between either the first or the second cavity and the die slot.

34. The extrusion die of any of exemplary embodiments 27 to 33, further comprising a pair of end blocks for supporting the plurality of shims.

35. The extrusion die of exemplary embodiment 34, wherein each of the shims has at least one (optionally, a plurality) through-hole for the passage of connectors between the pair of end blocks.

36. The extrusion die of either exemplary embodiment 34 or 35, wherein at least one end block has an inlet port for introduction of fluid material into the first cavity.

37. The extrusion die of any of exemplary embodiments 27 to 36, wherein the plurality of shims comprises a plurality of a repeating sequence of shims comprising a shim that provides a conduit between the first cavity and the die slot and a shim that provides a conduit between the second cavity and the die slot.

38. The extrusion die of any of exemplary embodiments of exemplary embodiments 27 to 37, wherein the plurality of shims comprises a plurality of a repeating sequence of shims comprising a shim that provides a conduit between the first cavity and the die slot, a spacer shim, a shim that provides a conduit between the second cavity and the die slot, and a spacer shim.

39. The extrusion die of exemplary embodiment 38, wherein the shims that provide a conduit between the first cavity and the die slot have a flow restriction compared to the shims that provides a conduit between the second cavity and the die slot.

40. The extrusion die of exemplary embodiment 36, wherein the portion of the distal opening provided by the shims that provides a conduit between the first cavity and the die slot is narrower than the portion of the distal opening provided by the shims provide a conduit between the second cavity and the die slot.

41. The extrusion die of any of exemplary embodiments of exemplary embodiments 27 to 40, wherein the plurality of shims comprises a plurality of a repeating sequence shims comprising a shim that provides a conduit between the first cavity and the die slot, a spacer shim, a shim that provides a conduit between the second cavity and the die slot, and a spacer shim, wherein the shims that provide a conduit between the second cavity and the die slot have a narrowed passage displaced from both edges of the distal opening.

42. The extrusion die of any of exemplary embodiments 27 to 41 comprising at least 1000 (optionally, at least 2000, 3000, 4000, 5000, 6000, 7000, 8000, 9000, or even at least 10,000) of the shims.

43. The extrusion die of any of exemplary embodiments 27 to 42, wherein the distal opening has an aspect ratio of at least 100:1 (optionally, at least 500:1, 1000:1, 2500:1, or even at least to 5000 to 1).

44. A method of making a composite layer, the method comprising:
providing an extrusion die of any of exemplary embodiments 27 to 43;
supplying a first extrudable polymeric material into the first cavity;
supplying a second extrudable polymeric material into the second cavity; and
extruding the first and second polymeric materials through the die slot and through the distal opening to provide a composite layer.

45. The method of exemplary embodiment 44, further comprising curing the first and second polymeric materials.

46. The method of either exemplary embodiment 44 or 45, further comprising quenching the extruded first and second polymeric materials on a chilled surface.

47. The method of any of exemplary embodiments 44 to 46, wherein the first polymeric material in the first cavity is at a first pressure greater than 689 kPa.

48. The method of any of exemplary embodiments 44 to 47, wherein the second polymeric material in the second cavity is at a second pressure greater than 689 kPa.

49. The method of any of exemplary embodiments 44 to 48, wherein, by volume, the ratio of the first polymeric material passing through the distal opening to the second polymeric material passing through the distal opening is at least 5:1 (optionally, 10:1, 20:1, 25:1, 50:1, 75:1, or even at least 100:1).

50. The method of any of exemplary embodiments 44 to 49, wherein the distal opening has an entrance and an exit, and wherein the first polymeric material and the second polymeric material contact each other not greater 25 mm from the entrance of the distal opening.

51. The method of any of exemplary embodiments 44 to 50, wherein the composite layer has a thickness in a range from 0.25 mm to 1 mm.

52. An extrusion die comprising a plurality of shims positioned adjacent to one another, the shims together defining a first cavity, a second cavity, and an die slot, wherein the die slot has a distal opening, wherein each of the plurality of shims defines a portion of the distal opening, wherein at least a first one of the shims provides a passageway between the first cavity and the die slot, wherein at least a second one of the shims provides a passageway between the second cavity and the die slot, wherein the shims each have first and second opposed major surfaces and a thickness perpendicular to the major surfaces, and wherein the passageways extend completely through the thickness of the respective shim.

53. The extrusion die of exemplary embodiment 52, further comprising a manifold body for supporting the shims, the manifold body having at least one manifold therein, the manifold having an outlet; and further comprising an expansion seal disposed so as to seal the manifold body and the shims, wherein the expansion seal defines a portion of at least one of the cavities, and wherein the expansion seal allows a conduit between the manifold and the cavity.

54. The extrusion die of exemplary embodiment 53, wherein the manifold body has at least two manifolds, wherein the second manifold is in a conduit with the other of the first or the second cavity.

55. The extrusion die of either exemplary embodiment 53 or 54, wherein the expansion seal defines a portion of both the first and the second cavities.

56. The extrusion die of any of exemplary embodiments 53 to 55, wherein the expansion seal is made of copper.

57. The extrusion die of any of exemplary embodiments 53 to 56, wherein the manifold body has receptacles oriented perpendicular to the distal opening for receiving heating elements.

58. The extrusion die of any of exemplary embodiments 52 to 57, wherein at least one of the shims is a spacer shim providing no conduit between either the first or the second cavity and the die slot.

59. The extrusion die of any of exemplary embodiments 52 to 58, further comprising a pair of end blocks for supporting the plurality of shims.

60. The extrusion die of exemplary embodiment 59, wherein each of the shims has at least one (optionally, a plurality) through-hole for the passage of connectors between the pair of end blocks.

61. The extrusion die of either exemplary embodiment 59 or 60, wherein at least one end block has an inlet port for introduction of fluid material into the first cavity.

62. The extrusion die of any of exemplary embodiments 52 to 61, wherein the plurality of shims comprises a plurality of a repeating sequence of shims comprising a shim that provides a conduit between the first cavity and the die slot and a shim that provides a conduit between the second cavity and the die slot.

63. The extrusion die of any of exemplary embodiments of exemplary embodiments 52 to 62, wherein the plurality of shims comprises a plurality of a repeating sequence of shims comprising a shim that provides a conduit between the first cavity and the die slot, a spacer shim, a shim that provides a conduit between the second cavity and the die slot, and a spacer shim.

64. The extrusion die of exemplary embodiment 63, wherein the shims that provide a conduit between the first cavity and the die slot have a flow restriction compared to the shims that provides a conduit between the second cavity and the die slot.

65. The extrusion die of exemplary embodiment 64, wherein the portion of the distal opening provided by the shims that provides a conduit between the first cavity and the die slot is narrower than the portion of the distal opening provided by the shims provide a conduit between the second cavity and the die slot.

66. The extrusion die of any of exemplary embodiments of exemplary embodiments 52 to 65, wherein the plurality of shims comprises a plurality of a repeating sequence shims comprising a shim that provides a conduit between the first cavity and the die slot, a spacer shim, a shim that provides a conduit between the second cavity and the die slot, and a spacer shim, wherein the shims that provide a conduit between the second cavity and the die slot have a narrowed passage displaced from both edges of the distal opening.

67. The extrusion die of any of exemplary embodiments 52 to 66 comprising at least 1000 (optionally, at least 2000, 3000, 4000, 5000, 6000, 7000, 8000, 9000, or even at least 10,000) of the shims.

68. The extrusion die of any of exemplary embodiments 52 to 67, wherein the first passage has a first average length and a first average minor perpendicular dimension, wherein the ratio of the first average length to the first average minor perpendicular dimension is in a range from 200:1 (optionally, 150:1, 100:1, 75:1, 50:1, or even 10:1) to greater than 1:1 (optionally, 2:1) (typically, 50:1 to 2:1), wherein the second passage has a second average length and a second average minor perpendicular dimension, and wherein the ratio of the second average length to the second average minor perpendicular dimension is in a range from 200:1 (optionally, 150:1, 100:1, 75:1, 50:1, or even 10:1) to greater than 1:1 (optionally, 2:1) (typically, 50:1 to 2:1).

69. The extrusion die of any of exemplary embodiments 52 to 68, if a fluid having a viscosity of 300 Pa*s at 220° C. is extruded through the extrusion die, the fluid has a shear rate of less than 2000/sec.

70. The extrusion die of any of exemplary embodiments 52 to 69, wherein the distal opening has an aspect ratio of at least 100:1 (optionally, at least 500:1, 1000:1, 2500:1, or even at least to 5000 to 1).

71. A method of making a composite layer, the method comprising:
providing an extrusion die of any of exemplary embodiments 52 to 70;
supplying a first extrudable polymeric material into the first cavity;
supplying a second extrudable polymeric material into the second cavity; and
extruding the first and second polymeric materials through the die slot and through the distal opening to provide a composite layer.

72. The method of exemplary embodiment 71, further comprising curing the first and second polymeric materials.

73. The method of either exemplary embodiment 71 or 72, further comprising quenching the extruded first and second polymeric materials on a chilled surface.

74. The method of any of exemplary embodiments 71 to 73, wherein the first polymeric material in the first cavity is at a first pressure greater than 689 kPa.

75. The method of any of exemplary embodiments 71 to 74, wherein the second polymeric material in the second cavity is at a second pressure greater than 689 kPa.

76. The method of any of exemplary embodiments 71 to 75, wherein, by volume, the ratio of the first polymeric material passing through the distal opening to the second polymeric material passing through the distal opening is at least 5:1 (optionally, 10:1, 20:1, 25:1, 50:1, 75:1, or even at least 100:1).

77. The method of any of exemplary embodiments 71 to 76, wherein the distal opening has an entrance and an exit, and wherein the first polymeric material and the second polymeric material contact each other not greater 25 mm from the entrance of the distal opening.

78. The method of any of exemplary embodiments 71 to 77, wherein the composite layer has a thickness in a range from 0.25 mm to 1 mm.

79. An extrusion die comprising a plurality of shims positioned adjacent to one another, the shims together defining a first cavity, a second cavity, and an die slot, wherein the die slot has a distal opening, wherein each of the plurality of shims defines a portion of the distal opening, wherein at least a first one of the shims provides a passageway between the first cavity and the die slot, wherein at least a second one of the shims provides a passageway between the second cavity and the die slot, and wherein at least one of the shims is a spacer shim providing no conduit between either the first or the second cavity and the die slot.

80. The extrusion die of exemplary embodiment 79, further comprising a manifold body for supporting the shims, the manifold body having at least one manifold therein, the manifold having an outlet; and further comprising an expansion seal disposed so as to seal the manifold body and the shims, wherein the expansion seal defines a portion of at least one of the cavities, and wherein the expansion seal allows a conduit between the manifold and the cavity.

81. The extrusion die of exemplary embodiment 80, wherein the manifold body has at least two manifolds, wherein the second manifold is in a conduit with the other of the first or the second cavity.

82. The extrusion die of either exemplary embodiment 80 or 81, wherein the expansion seal defines a portion of both the first and the second cavities.

83. The extrusion die of any of exemplary embodiments 80 to 82, wherein the expansion seal is made of copper.

84. The extrusion die of any of exemplary embodiments 80 to 83, wherein the manifold body has receptacles oriented perpendicular to the distal opening for receiving heating elements.

85. The extrusion die of any of exemplary embodiments 80 to 84, wherein at least one of the shims is a spacer shim providing no conduit between either the first or the second cavity and the die slot.

86. The extrusion die of any of exemplary embodiments 79 to 85 further comprising a pair of end blocks for supporting the plurality of shims.

87. The extrusion die of exemplary embodiment 86, wherein each of the shims has at least one (optionally a plurality) through-hole for the passage of connectors between the pair of end blocks.

88. The extrusion die of any of exemplary embodiments 79 to 87, wherein at least one end block has an inlet port for introduction of fluid material into the first cavity.

89. The extrusion die of any of exemplary embodiments 79 to 88, wherein the plurality of shims comprises a plurality of a repeating sequence of shims comprising a shim that provides a conduit between the first cavity and the die slot and a shim that provides a conduit between the second cavity and the die slot.

90. The extrusion die of any of exemplary embodiments 79 to 88, wherein the plurality of shims comprises a plurality of a repeating sequence of shims comprising a shim that provides a conduit between the first cavity and the die slot, a spacer shim, a shim that provides a conduit between the second cavity and the die slot, and a spacer shim.

91. The extrusion die of exemplary embodiment 90, wherein the shims that provide a conduit between the first cavity and the die slot have a flow restriction compared to the shims that provides a conduit between the second cavity and the die slot.

92. The extrusion die of exemplary embodiment 91, wherein the portion of the distal opening provided by the shims that provides a conduit between the first cavity and the die slot is narrower than the portion of the distal opening provided by the shims provide a conduit between the second cavity and the die slot.

93. The extrusion die of any of exemplary embodiments of exemplary embodiments 79 to 92, wherein the plurality of shims comprises a plurality of a repeating sequence shims comprising a shim that provides a conduit between the first cavity and the die slot, a spacer shim, a shim that provides a conduit between the second cavity and the die slot, and a spacer shim, wherein the shims that provide a conduit between the second cavity and the die slot have a narrowed passage displaced from both edges of the distal opening.

94. The extrusion die of any of exemplary embodiments 79 to 93 comprising at least 1000 (optionally, at least 2000, 3000, 4000, 5000, 6000, 7000, 8000, 9000, or even at least 10,000) of the shims.

95. The extrusion die of any of exemplary embodiments 79 to 94, wherein if a fluid having a viscosity of 300 Pa*s at 220° C. is extruded through the extrusion die, the fluid has a shear rate of less than 2000/sec.

96. The extrusion die of any of exemplary embodiments 79 to 95, wherein the distal opening has an aspect ratio of at least 100:1 (optionally, at least 500:1, 1000:1, 2500:1, or even at least to 5000 to 1).

97. A method of making a composite layer, the method comprising:
providing an extrusion die of any of exemplary embodiments 79 to 96;
supplying a first extrudable polymeric material into the first cavity;
supplying a second extrudable polymeric material into the second cavity; and
extruding the first and second polymeric materials through the die slot and through the distal opening to provide a composite layer.

98. The method of exemplary embodiment 97, further comprising curing the first and second polymeric materials.

99. The method of either exemplary embodiment 97 or 98, further comprising quenching the extruded first and second polymeric materials on a chilled surface.

100. The method of any of exemplary embodiments 97 to 99 wherein the first polymeric material in the first cavity is at a first pressure greater than 689 kPa.

101. The method of any of exemplary embodiments 97 to 100, wherein the second polymeric material in the second cavity is at a second pressure greater than 689 kPa.

102. The method of any of exemplary embodiments 97 to 101, wherein, by volume, the ratio of the first polymeric material passing through the distal opening to the second polymeric material passing through the distal opening is at least 5:1 (optionally, 10:1, 20:1, 25:1, 50:1, 75:1, or even at least 100:1).

103. The method of any of exemplary embodiments 97 to 102, wherein the distal opening has an entrance and an exit, and wherein the first polymeric material and the second polymeric material contact each other not greater 25 mm from the entrance of the distal opening.

104. The method of any of exemplary embodiments 97 to 103, wherein the composite layer has a thickness in a range from 0.25 mm to 1 mm.

105. A method of making a composite layer, the method comprising:
providing an extrusion die comprising a plurality of shims positioned adjacent to one another, the shims together defining a first cavity, a second cavity, and an die slot, wherein the die slot has a distal opening, wherein each of the plurality of shims defines a portion of the distal opening, wherein at least a first one of the shims provides a conduit between the first cavity and the die slot, wherein at least a second one of the shims provides a conduit between the second cavity and the die slot;
supplying a first extrudable polymeric material into the first cavity;
supplying a second extrudable polymeric material into the second cavity; and
extruding the first and second polymeric materials through the die slot and through the distal opening to provide the composite layer comprising at least one distinct region of the first polymeric material and at least one distinct region of the second polymeric material.

106. The method of exemplary embodiment 105, further comprising curing the first and second polymeric materials.

107. The method of either exemplary embodiment 105 or 106, further comprising quenching the extruded first and second polymeric materials on a chilled surface.

108. The method of any of exemplary embodiments 105 to 107, wherein the first polymeric material in the first cavity is at a first pressure greater than 689 kPa.

109. The method of any of exemplary embodiments 105 to 108, wherein the second polymeric material in the second cavity is at a second pressure greater than 689 kPa.

110. The method of any of exemplary embodiments 105 to 109, wherein, by volume, the ratio of the first polymeric material passing through the distal opening to the second polymeric material passing through the distal opening is at least 5:1 (optionally, 10:1, 20:1, 25:1, 50:1, 75:1, or even at least 100:1).

111. The method of any of exemplary embodiments 105 to 110 wherein the distal opening has an entrance and an exit, and wherein the first polymeric material and the second polymeric material contact each other not greater 25 mm from the entrance of the distal opening.

112. The method of any of exemplary embodiments 105 to 111, wherein the composite layer has a thickness in a range from 0.25 mm to 1 mm.

Advantages and embodiments of this disclosure are further illustrated by the following examples, but the particular materials and amounts thereof recited in these examples, as well as other conditions and details, should not be construed to unduly limit this disclosure. All parts and percentages are by weight unless otherwise indicated.

Example 1

A co-extrusion die as generally depicted in FIG. 1, and assembled with a 4-shim repeating pattern as generally illustrated in FIG. 4, was prepared. The thickness of the shims in the repeat sequence was 5 mils (0.127 mm) for the shims with connection to the first cavity, 3 mils (0.076 mm) for the shims with connection to the second cavity, and 2 mils (0.05 mm) for the spacers which had no connection to either cavity. The shims were formed from stainless steel, with the perforations cut by a numerical control laser cutter.

The inlet fittings on the two end blocks were each connected to a conventional single-screw extruder. A chill roll was positioned adjacent to the distal opening of the co-extrusion die to receive the extruded material. The extruder feeding the first cavity (Polymer A in the Table 1, below) was loaded with polyethylene pellets (obtained under the trade designation "ENGAGE PE 8402" from Dow Corporation, Midland, Mich.).

TABLE 1

| | Example 1 | Example 2 | Example 3 | Example 4 | Example 5 | Example 6 | Example 7 |
|---|---|---|---|---|---|---|---|
| kg/hr of Polymer A | 2.5 | 2.3 | 1.8 | 1.8 | 0.92 | .45 | 1.2 |
| kg/hr of Polymer B | 0.14 | 1.0 | 0.2 | 0.45 | 1.68 | .15 | .25 |
| Polymer A Barrel 1 Temp., °C. | 177 | 177 | 177 | 121 | 149 | 80 | 93 |
| Polymer A Remaining Barrel Temp., °C. | 199 | 210 | 204 | 191 | 177 | 149 | 121 |
| Polymer A Melt Stream Temp., °C. | 199 | 204 | 204 | 191 | 191 | 204 | 176 |
| Polymer B Barrel 1 Temp., °C. | 177 | 177 | 185 | 249 | 185 | 185 | 135 |
| Polymer B Remaining Barrel Temp., °C. | 199 | 204 | 204 | 260 | 193 | 204 | 176 |
| Polymer B Melt Stream Temp., °C. | 199 | 191 | 204 | 260 | 199 | 204 | 190 |
| Die Temp., °C. | 199 | 204 | 218 | 249 | 199 | 204 | 190 |
| Chill roll Temp., °C. | 60 | 27 | 15 | 27 | 54 | 15 | 15 |
| Chill roll surface speed, m/min. | 1.2 | 3 | 6 | 1.8 | 3 | 6 | 6 |

The extruder feeding the second cavity (Polymer B in the Table 1, above) was loaded with polyethylene pellets ("ENGAGE PE 8402") and 5% by weight black polypropylene color concentrate (obtained from Clariant Corporation, Minneapolis, Minn.). Other process conditions are listed in Table 1, above. A cross-section of the resulting 0.76 mm (30 mils) thick extruded composite layer is shown in FIG. 5 (Polymer A 82a and Polymer B 82b).

Using an optical microscope, the pitch, $p_5$, as shown in FIG. 5 was measured. The results are shown in Table 2, below.

TABLE 2

| Measurement | Example 1 $p_5$, micrometer | Example 2 $l_7$, micrometer | Example 3 $l_9$, micrometer | Example 4 $l_{11}$, micrometer | Example 5 $d_{13}$, micrometer |
|---|---|---|---|---|---|
| 1 | 290 | 310 | 269 | 366 | 194 |
| 2 | 283 | 306 | 252 | 353 | 207 |
| 3 | 298 | 322 | 273 | 342 | 219 |
| 4 | 295 | 328 | 270 | 362 | 238 |
| 5 | 280 | 328 | 258 | 353 | 188 |
| 6 | 305 | 335 | 265 | 330 | 218 |
| 7 | 276 | 325 | 265 | 382 | 204 |
| 8 | 304 | 325 | 268 | 357 | 203 |
| 9 | 295 | 335 | 262 | 345 | 204 |
| 10 | 289 | 311 | 275 | 365 | 212 |
| Average of the 10 measurements | 291 | 322.5 | 265.7 | 355.6 | 208.7 |

Example 2

A co-extrusion die as generally depicted in FIG. 1, and assembled with a 4-shim repeating pattern as generally illustrated in FIG. 6, was prepared. The thickness of the shims in the repeat sequence was 5 mils (0.127 mm) for the shims with connection to the first cavity, 5 mils (0.127 mm) for the shims with connection to the second cavity, and 2 mils (0.05 mm) for the spacers which had no connection to either cavity. The shims were formed from stainless steel, with the perforations cut by a numerical control laser cutter.

The inlet fittings on the two end blocks were each connected to a conventional single-screw extruder. A chill roll was positioned adjacent to the distal opening of the co-extrusion die to receive the extruded material. The extruder feeding the first cavity (Polymer A in the Table 1, above) was loaded with polyethylene pellets (obtained under the trade designation "ENGAGE PE 8200" from Dow Corporation). The extruder feeding the second cavity (Polymer B in the Table 1, above) was loaded with polyethylene pellets ("ENGAGE PE 8200") and 5% by weight black polypropylene color concentrate (obtained from Clariant Corporation). Other process conditions are listed in Table 1, below. A cross-section of the resulting 0.5 mm (20 mils) thick extruded composite layer is shown in FIG. 7 (Polymer A 96a and Polymer B 96b).

Using an optical microscope, the length, $l_7$, as shown in FIG. 7 was measured. The results are shown in Table 2, above.

Example 3

A co-extrusion die as generally depicted in FIG. 1, and assembled with a 4-shim repeating pattern as generally illustrated in FIG. 8, was prepared. The thickness of the shims in the repeat sequence was 5 mils (0.127 mm) for the shims with connection to the first cavity, 5 mils (0.127 mm) for the shims with connection to the second cavity, and 2 mils (0.05 mm) for the spacers which had no connection to either cavity. The shims were formed from stainless steel, with the perforations cut by a numerical control laser cutter.

The inlet fittings on the two end blocks were each connected to a conventional single-screw extruder. A chill roll was positioned adjacent to the distal opening of the co-extrusion die to receive the extruded material. The extruder feeding the first cavity (Polymer A in the Table 1, above) was loaded with polypropylene pellets (obtained under the trade designation "EXXONMOBIL 1024 PP" from ExxonMobil, Irving, Tex.). The extruder feeding the second cavity (Polymer B in the Table 1, above) was loaded with polypropylene pellets "EXXONMOBIL 1024 PP") and 10% by weight black polypropylene color concentrate (obtained from Clariant Corporation). Other process conditions are listed in the Table 1, above. A cross-section of the resulting 0.3 mm (12 mils) thick extruded composite layer is shown in FIG. 9 (Polymer A 114b and Polymer B 114a).

Using an optical microscope, the length, $l_9$, as shown in FIG. 9 was measured. The results are shown in Table 2, above.

Example 4

A co-extrusion die as generally depicted in FIG. 1, and assembled with a 4-shim repeating pattern as generally illustrated in FIG. 10, was prepared. The thickness of the shims in the repeat sequence was 5 mils (0.127 mm) for the shims with connection to the first cavity, 5 mils (0.127 mm) for the shims with connection to the second cavity, and 2 mils (0.05 mm) for the spacers which had no connection to either cavity. The shims were formed from stainless steel, with the perforations cut by a numerical control laser cutter.

The inlet fittings on the two end blocks were each connected to a conventional single-screw extruder. A chill roll was positioned adjacent to the distal opening of the co-extrusion die to receive the extruded material. The extruder feeding the first cavity (Polymer A in the Table 1, above) was loaded with polyethylene pellets (obtained under the trade designation "ENGAGE PE 8401" from Dow Corporation). The extruder feeding the second cavity (Polymer B in the Table 1, above) was loaded with a copolymer of polyethylene terephthalate and polyethylene napthalate (80% napthalate comonomer and 20% terephthalate comonomer) (made as generally described in U.S. Pat. No. 6,352,761 (Hebrink et al.)) and 5% by weight black polypropylene color concentrate (obtained from Clariant Corporation). Other process conditions are listed in the Table 1, above. A cross-section of the resulting 0.46 mm (18 mils) thick extruded composite layer in FIG. 11 (Polymer A 142a and Polymer B 142b).

Using an optical microscope, the length, $l_{11}$, as shown in FIG. 11 was measured. The results are shown in Table 2, above.

Example 5

A co-extrusion die as generally depicted in FIG. 1, and assembled with a 2-shim repeating pattern generally as illustrated in FIG. 12, was prepared. The thickness of the shims in the repeat sequence was 5 mils (0.127 mm) for the shims with connection to the first cavity, and 5 mils (0.127 mm) for the shims with connection to the second cavity. There were no spacers in this configuration. The shims were formed from stainless steel, with the perforations cut by a numerical control laser cutter.

The inlet fittings on the two end blocks were each connected to a conventional single-screw extruder. A chill roll was positioned adjacent to the distal opening of the co-extrusion die to receive the extruded material. The extruder feeding the first cavity (Polymer A in the Table 1, above) was loaded with low density polyethylene (obtained under the trade designation "DOW LDPE 722" from Dow Corporation). The extruder feeding the second cavity (Polymer B in the Table 1, above) was loaded with polypropylene pellets ("EXXONMOBIL 1024 PP") and 2% by weight black polypropylene color concentrate (obtained from Clariant Corporation). Other process conditions are listed in the Table 1, above. A cross-section of the resulting 0.56 mm (22 mils) thick extruded composite layer is shown in FIG. 13 (Polymer A 152a and Polymer B 152b).

Using an optical microscope, the distance, $d_{13}$, as shown in FIG. 13 was measured. The results are shown in Table 2, above.

Example 6

A co-extrusion die as generally depicted in FIG. 1 was assembled with a 10-shim repeating pattern. This 10-shim repeating pattern used shims similar to those illustrated in FIG. 8, but in a different, larger sequence. Referring now to FIG. 8, the 10-shim repeating pattern was: 40a, 40c, 40a, 40c, 40a, 40c, 40a, 40c, 109, and 40c. Similar to Example 3 above, the thickness of the 40a shims in the repeat sequence was 5 mils (0.127 mm), the thickness of the 110 shims was also 5 mils (0.127 mm), and the thickness of the spacer shims 40c was 2 mils (0.05 mm). The shims were formed from stainless steel, with the perforations cut by a numerical control laser cutter.

An acrylate copolymer pressure sensitive adhesive composed of 93% ethyl hexyl acrylate monomer and 7% acrylic acid monomer (made as generally described in U.S. Pat. No. 2,884,126 (Ulrich)) was fed into the first cavity of the die, (polymer A in Table 1). Specifically, the adhesive was pumped into the extruder using an adhesive pump (obtained from Bonnot, Company, Uniontown, Ohio, under the trade designation "2WPKR"), using a heated hose. The temperatures were set at 175° C. for the pump and hose. A polyethylene polymer (obtained from ExxonMobil Chemical Company, Houston Tex., under the trade designation "EXACT 3024") was fed into the second cavity of the die, (polymer B in Table 1) by a melt train of conventional type.

A chill roll was positioned adjacent to the distal opening of the co-extrusion die, and a 2 mils (0.05 mm) thick polyethylene terephthalate (PET) film with a release coating (obtained from Loparex LLC, Willowbrook, Ill., under the trade designation "2.0 CL PET 7340AM") was conveyed around the chill roll so as to receive the extruded material on the release side. The line speed was adjusted so that a 3 mils (75 micrometers) thick coating was extruded onto the film. Other process conditions are detailed in Table 1, above.

This arrangement of shims produced an extruded composite layer that is solid adhesive on one side and mostly pressure sensitive adhesive broken by regularly spaced polyethylene ribs on the other. The composite layer exhibited a commercially useful low-tack feel. When handled with neoprene gloves, for example, it tended to not stick to the gloves. When placed firmly onto a flexible substrate such as skin, however, it tended to anchor firmly. Matching the flexibility of the backing and the flexibility of the surface to which the pressure sensitive adhesive side is applied should allow tapes to be made with tailored adhesion properties. Adhesion performance can also be tailored for release with use of backings which can be stretched. This enables the user to release the adhesive by stretching the tape backing and the adhesive. An example of a useful backing for such purpose would be a polyester spunlace fabric (available from DuPont, Old Hickory, Tenn., under the trade designation "SOFTESSE 8051"). By aligning the adhesive and polyethylene strands perpendicular to the direction of stretch, there could be created a repeating disruption in the peel front, which would allow the user to remove it from skin with a less degree of trauma.

Example 7

A co-extrusion die as generally depicted in FIG. 1 was assembled with a 12-shim repeating pattern. This 12-shim repeating pattern used shims similar to those illustrated in FIG. 6, but in a different, larger sequence. Referring now to FIG. 6, the 12-shim repeating pattern was: 90, 40c, 90, 40c, 90a, 40c, 40a, 40c, 40a, 40c, 40a, and 40c. Similar to Example 2 above, the thickness of the "40a" shims in the repeat sequence was 5 mils (0.127 mm), the thickness of the "90" shims was also 5 mils (0.127 mm), and the thickness of the spacer shims "40c" was 2 mils (0.05 mm). The shims were formed from stainless steel, with the perforations cut by a numerical control laser cutter.

An acrylate copolymer pressure sensitive adhesive composed of 93% ethyl hexyl acrylate monomer and 7% acrylic acid monomer (made as generally described in U.S. Pat. No. 2,884,126 (Ulrich)) was fed into the first cavity of the die, (polymer A in Table 1). Specifically, the adhesive was pumped into the extruder using an adhesive pump ("2WPKR"), using a heated hose. The temperatures were set at 175° C. for the pump and hose. A polyethylene polymer ("EXACT 3024") was fed into the second cavity of the die, (polymer B in Table 1) by a melt train of conventional type.

A chill roll was positioned adjacent to the distal opening of the co-extrusion die, and a 2 mils (0.05 mm) thick polyethylene terephthalate (PET) film with a release coating ("2.0 CL PET 7340AM") was conveyed around the chill roll so as to receive the extruded material on the release side. The line speed was adjusted so that a 3 mils (75 micrometers) thick coating was extruded onto the film. Other process conditions are detailed in Table 1, above.

The resulting composite layer had some resemblance to the film of FIG. 7, but the surrounded zones were wider and were spaced more widely apart.

Foreseeable modifications and alterations of this disclosure will be apparent to those skilled in the art without departing from the scope and spirit of this disclosure. This disclosure should not be restricted to the embodiments that are set forth in this application for illustrative purposes.

What is claimed is:

1. An extrusion die comprising a plurality of shims positioned adjacent to one another, the shims together defining a first cavity, a second cavity, and an die slot, wherein the die slot has a single distal opening, wherein each of the plurality of shims defines a portion of the single distal opening, wherein at least a first one of the shims provides a passageway between the first cavity and the die slot, wherein at least a second one of the shims provides a passageway between the second cavity and the die slot, and wherein at least one of the shims is a spacer shim providing no conduit between either the first or the second cavity and the die slot, and wherein the shims that provide a conduit between the second cavity and the die slot have a narrowed passage displaced from both edges of the distal opening.

2. The extrusion die of claim 1, further comprising a manifold body for supporting the shims, the manifold body having at least one manifold therein, the manifold having an outlet; and further comprising an expansion seal disposed so as to seal the manifold body and the shims, wherein the expansion seal defines a portion of at least one of the cavities, and wherein the expansion seal allows a conduit between the manifold and the cavity.

3. The extrusion die of claim 1, wherein the distal opening has an aspect ratio of at least 100:1.

4. A method of making a composite layer, the method comprising:
providing an extrusion die of claim 1;
supplying a first extrudable polymeric material into the first cavity;
supplying a second extrudable polymeric material into the second cavity; and
extruding the first and second polymeric materials through the die slot and through the distal opening to provide a composite layer.

5. The extrusion die of claim 2, wherein the manifold body has at least two manifolds, wherein the second manifold is connected by a conduit with the other of the first or the second cavity.

6. The extrusion die of claim 2, wherein the expansion seal defines a portion of both the first and the second cavities.

7. The extrusion die of claim 2, wherein the manifold body has receptacles oriented perpendicular to the distal opening for receiving heating elements.

8. The extrusion die of claim 1, wherein the plurality of shims comprises a plurality of a repeating sequence of shims comprising a shim that provides a conduit between the first cavity and the die slot and a shim that provides a conduit between the second cavity and the die slot.

9. The extrusion die of claim 1, wherein the plurality of shims comprises a plurality of a repeating sequence of shims comprising a shim that provides a conduit between the first cavity and the die slot, a spacer shim, a shim that provides a conduit between the second cavity and the die slot, and a spacer shim.

10. The extrusion die of claim 9, wherein the shims that provide a conduit between the first cavity and the die slot have a flow restriction compared to the shims that provides a conduit between the second cavity and the die slot.

11. An extrusion die comprising a plurality of shims positioned adjacent to one another, the shims together defining a first cavity, a second cavity, and an die slot, wherein the die slot has a distal opening, wherein each of the plurality of shims defines a portion of the distal opening, wherein at least a first one of the shims provides a passageway between the first cavity and the die slot, wherein at least a second one of the shims provides a passageway between the second cavity and the die slot, wherein the shims provide a passageway between the second cavity and the die slot have first and second opposed major surfaces, wherein said passageway extends from the first major surface to the second major surface, wherein the plurality of shims comprises a plurality of a repeating sequence shims comprising a shim that provides a conduit between the first cavity and the die slot, a spacer shim, a shim that provides a conduit between the second cavity and the die slot, and a spacer shim, wherein the shims that provide a conduit between the second cavity and the die slot have a narrowed passage displaced from both edges of the distal opening.

* * * * *